(12) United States Patent
Ueno et al.

(10) Patent No.: US 7,826,696 B2
(45) Date of Patent: Nov. 2, 2010

(54) OPTICAL DEFLECTION METHOD AND OPTICAL DEFLECTION APPARATUS

(75) Inventors: Ichiro Ueno, Isehara (JP); Nobutaka Tanigaki, Ikeda (JP); Noritaka Yamamoto, Ikeda (JP); Toshiko Mizokuro, Ikeda (JP); Takashi Hiraga, Ikeda (JP); Norio Tanaka, Tokyo (JP); Hiroshi Nagaeda, Ichikawa (JP); Noriyasu Shiga, Ichikawa (JP)

(73) Assignee: Dainichiseika Color & Chemicals Mfg. Co., Ltd., Tokyo (JP)

( * ) Notice: Subject to any disclaimer, the term of this patent is extended or adjusted under 35 U.S.C. 154(b) by 176 days.

(21) Appl. No.: 12/223,665

(22) PCT Filed: Feb. 21, 2007

(86) PCT No.: PCT/JP2007/053707

§ 371 (c)(1),
(2), (4) Date: Aug. 6, 2008

(87) PCT Pub. No.: WO2007/099979

PCT Pub. Date: Sep. 7, 2007

(65) Prior Publication Data
US 2009/0022453 A1 Jan. 22, 2009

(30) Foreign Application Priority Data

Feb. 22, 2006 (JP) .............................. 2006-046027
Feb. 22, 2006 (JP) .............................. 2006-046028
Feb. 22, 2006 (JP) .............................. 2006-046029

(51) Int. Cl.
*G02B 6/26* (2006.01)
*G02F 1/03* (2006.01)

(52) U.S. Cl. .......................... 385/16; 385/33; 359/240; 359/244; 359/288

(58) Field of Classification Search ................... 385/16, 385/31–349, 18; 359/240–244, 288, 299
See application file for complete search history.

(56) References Cited

U.S. PATENT DOCUMENTS

| 4,585,301 A | 4/1986 | Bialkowski |
| 4,776,677 A | 10/1988 | Park et al. |
| 5,121,246 A | 6/1992 | Lasher et al. |
| 6,265,708 B1 | 7/2001 | Tanaka et al. |
| 7,142,305 B2 * | 11/2006 | Yamaguchi et al. ......... 356/432 |

FOREIGN PATENT DOCUMENTS

JP     A-60-014221     1/1985

OTHER PUBLICATIONS

Salazar et al., "Thermal diffusivity measurements on solids using collinear mirage detection," *Journal of Applied Physics*, vol. 74, No. 3, Aug. 1, 1993, pp. 1539-1547.

*Primary Examiner*—Hemang Sanghavi
(74) *Attorney, Agent, or Firm*—Oliff & Berridge, PLC

(57) ABSTRACT

An optical deflection apparatus includes a signal light source configured to emit signal light having one or more wavelengths, a control light source configured to emit control light having a wavelength different from the wavelength of the signal light, a thermal lens forming optical element including a light absorption layer configured to transmit the signal light and selectively absorb the control light, and a beam-condensing unit configured to cause beam-condensation of the control light and the signal light at different convergence points in the light absorption layer. The thermal lens forming optical element causes convergence and divergence of the control light and the signal light on an incidence plane of the light absorption layer or its vicinity in a light traveling direction, wherein a thermal lens is reversibly formed in the light absorption layer due to a temperature increase occurring in a region where the control light is absorbed and its peripheral region, and the thermal lens changes a refractive index to change a traveling direction of the signal light.

10 Claims, 26 Drawing Sheets

FOREIGN PATENT DOCUMENTS

| | | |
|---|---|---|
| JP | A-08-286220 | 11/1996 |
| JP | A-08-320535 | 12/1996 |
| JP | A-08-320536 | 12/1996 |
| JP | A-09-329816 | 12/1997 |
| JP | A-10-090733 | 4/1998 |
| JP | A-10-090734 | 4/1998 |
| JP | A-10-148852 | 6/1998 |
| JP | A-10-148853 | 6/1998 |
| JP | A-11-194373 | 7/1999 |
| WO | WO 2004/027508 A1 | 4/2004 |

* cited by examiner

DEFLECTION OF SIGNAL LIGHT SUBJECTED TO NO BEAM-CONDENSATION

DEFLECTION OF SIGNAL LIGHT SUBJECTED TO BEAM-CONDENSATION

WITH CONTROL LIGHT

| No. | LIGHT ABSORPTION LAYER POSITION (μm) | CONTROL LIGHT POSITION (μm) | CONTROL LIGHT ON-Off | DATA | | EXTINCTION RATIO (dB) | |
|---|---|---|---|---|---|---|---|
| | | | | NON-DEFLECTED LIGHT | DEFLECTED LIGHT | NON-DEFLECTED LIGHT | DEFLECTED LIGHT |
| 1 | 85 | 13 | ON | 0.1μW OR LESS | 1.3mW | 41.5 | 41.1 |
| | | | Off | 1.4mW | 0.1μW OR LESS | | |
| 2 | 55 | 16 | ON | 0.1μW OR LESS | 1.28mW | 41.5 | 41.1 |
| | | | Off | 1.4mW | 0.1μW OR LESS | | |
| 3 | 30 | 22 | ON | 0.1μW OR LESS | 1.55mW | 41.5 | 41.9 |
| | | | Off | 1.45mW | 0.1μW OR LESS | | |
| 4 | 20 | 25 | ON | 0.1μW OR LESS | 1.6mW | 41.5 | 42.0 |
| | | | Off | 1.45mW | 0.1μW OR LESS | | |
| 5 | 10 | 34 | ON | 0.1μW OR LESS | 1.65mW | 41.5 | 42.2 |
| | | | Off | 1.4mW | 0.1μW OR LESS | | |
| 6 | 0 | 43 | ON | 0.1μW OR LESS | 1.68mW | 41.5 | 42.3 |
| | | | Off | 1.4mW | 0.1μW OR LESS | | |
| 7 | -10 | 46 | ON | 0.2μW | 1.65mW | 38.5 | 39.2 |
| | | | Off | 1.4mW | 0.2μW | | |

Fig. 22

| No. | LIGHT ABSORPTION LAYER POSITION (μm) | CONTROL LIGHT POSITION (μm) | CONTROL LIGHT ON-Off | DATA | | EXTINCTION RATIO (dB) | |
|---|---|---|---|---|---|---|---|
| | | | | NON-DEFLECTED LIGHT | DEFLECTED LIGHT | NON-DEFLECTED LIGHT | DEFLECTED LIGHT |
| 1 | 500 | 25 | ON | 0.1μW OR LESS | 1.1mW | 41.5 | 40.4 |
| | | | Off | 1.3mW | 0.1μW OR LESS | | |
| 2 | 500 | 25 | ON | 0.1μW OR LESS | 0.88mW | 41.5 | 39.4 |
| | | | Off | 1.3mW | 0.1μW OR LESS | | |

Fig. 30

OPTICAL DEFLECTION METHOD AND OPTICAL DEFLECTION APPARATUS

BACKGROUND OF THE INVENTION

1. Field of the Invention

The present invention relates to a technique preferably used in the field of photo-electronics (photonics), such as optical communication and optical information processing, including a thermal lens forming optical element, a deflection element having the thermal lens forming optical element, an optical control method using the thermal lens forming optical element, and an optical control apparatus equipped with the thermal lens forming optical element. More particularly, the present invention relates to a technique capable of causing deflection of light (signal light) based on a change in a refractive index of the thermal lens forming optical element, a deflection element having the thermal lens forming optical element, an optical control method using the thermal lens forming optical element, and an optical control apparatus equipped with the thermal lens forming optical element.

Moreover, the present invention relates to a deflection-type optical path switching apparatus and an optical path switching method preferably used in the optical communication field and the optical information processing field.

2. Description of the Invention

The deflection of light can be caused by:
(1) mechanically tilting a mirror;
(2) mechanically rotating a polygonal mirror;
(3) acoustooptic effects; or
(4) electro-optical effects.

The above-listed method (1) using a mechanically tilting mirror requires an expensive control mechanism to realize accurate deflection and cannot be used at higher frequencies. The above-listed method (2) using a rotatable polygon mirror requires higher costs. The above-listed methods (3) using acoustooptic effects and (4) using electro-optical effects both require higher costs and larger scale devices, yet are only capable of creating relatively small deflection angles.

Modulation of light can be realized by generating a temperature-dependent refractive index distribution in a medium (refer to Japanese Patent Application Laid-Open No. 60-14221). The method discussed in this art includes heating a medium using a heat-generation resistor, generating a refractive index distribution in the medium, and causing deflection of light. The deflected light is selectively shielded by a light-shielding plate to realize flickering of a light spot. However, the method discussed in the above-noted prior art is not free from a "divergence of heat" problem because the heat-generation resistor (i.e., heat generation element) relies of heat conduction to heat a medium. More specifically, the "divergence of heat" deteriorates the formation of a finely controlled heat gradient in a wide area. Accordingly, a desired refractive index distribution cannot be obtained. Furthermore, a photolithography technique, which is preferably employed in the manufacturing of semiconductor integrated circuits, cannot be used to finely machine or process a heat-generation resistor. Due to such practical restrictions, the size of an element tends to become larger. If an element size is increased, an optical system will be structurally complicated and enlarged correspondingly. Furthermore, when a heat-generation resistor is used as a heat-generation element, the response is slow because the temperature increase of the medium is dependent on heat conduction. Furthermore, as an inherent problem, the refractive index change at higher frequencies cannot be attained.

Furthermore, a laser can be used to heat a material and change a refractive index of the material for deflection of the laser beam (refer to U.S. Pat. Nos. 4,776,677 and 4,585,301). The methods discussed in the above-noted prior art documents require a high power laser having a large beam size to create desirable deflection of the laser beam. The method discussed in U.S. Pat. No. 4,776,677 can cause deflection of emitted light by heat generated by the emitted light itself. If the method discussed in U.S. Pat. No. 4,776,677 is used for optical deflection, the emitted light is almost absorbed to heat a material and change a refractive index. According to the principle, only a small quantity of light can pass through the material.

The method discussed in U.S. Pat. No. 4,585,301 uses no electrical or mechanical mechanism. An optical switch disclosed in the U.S. Pat. No. 4,585,301 can change a refractive index with an emitted control beam and change an optical path of a signal beam. However, in this case, the laser must have a large power to change the refractive index because no lens is used for beam-condensation of the control beam and the signal beam. Furthermore, the apparatus has a larger size. Moreover, the deflection angle cannot be enlarged because there is no mechanism for expanding a refraction change region according to traveling of a beam as proposed in the present invention.

Furthermore, a deflection element can include a thermal lens forming optical element containing a photoreactive composition and an intensity distribution adjustment mechanism for irradiating the thermal lens forming optical element with a beam having a wedge-shaped light intensity distribution (refer to Japanese Patent Application Laid-Open No. 11-194373). The refractive index distribution can be formed in the thermal lens forming optical element with control light. Deflection of signal light can be realized by using the refractive index distribution. The wavelength of the signal light differs from that of the control light. Although it is excellent to use light to control light, the above-described system requires a highly-advanced adjustment technique for the intensity distribution adjustment mechanism that irradiates the thermal lens forming optical element with a beam having a wedge-shaped light intensity distribution. Even a slight change in the control light intensity will result in a large change in the deflection angle.

The widespread use of the Internet and corporate and home networks has meanwhile led to a rapid increase in network traffic. Thus, an optical path switching apparatus including no intervening electric signal (optical switch), i.e., a light-light direct switch, is desired. A practical apparatus and method for switching an optical path, e.g., an optical fiber, an optical waveguide, or a route of light traveling in a space, can be a space division type according to which an optical path is switched in an optical waveguide or between optical waveguides, a wavelength-division multiplex type according to which wavelength multiplexed light is divided and switched to optical paths corresponding to respective wavelengths, a time-division multiplex type according to which time-division multiplexed light is switched to a corresponding optical path at predetermined timing, or a free-space type according to which an optical path of light propagating in a space is spatially divided/mixed using a mirror or a shutter. Multiplexing or combining the above-described apparatus/methods is also feasible.

The space division type optical switch can be an optical switch utilizing a directional coupler, an optical switch that forms a copy of a light signal using a light branch unit and turns on/off the light with a gate element, or an optical switch that changes a refractive index of a waveguide at a crossing or Y-branch portion to selectively transmit or reflect the light propagating in the waveguide, although these switches are in a research and development stage. To change a refractive index of a waveguide of a Mach-Zehnder interferometer-type optical waveguide switch, an optical switch using thermo-optical effects obtainable from heat generation by an electric heater is almost practically usable. However, not only the response speed is as low as 1 msec but also an electric signal is used for the action of an optical switch.

The free-space type optical switch can be a micro electro mechanical system (MEMS), an exciton absorption reflection switch (EARS switch), a multi-stage beam shifter-type optical switch, a hologram-type optical switch, or a liquid crystal switch. However, these switches cannot be practically used because of a mechanically movable portion and polarization dependency.

On the other hand, transmissivity or refractive index can be changed by irradiating a thermal lens forming optical element with light. The research for developing a full-light type thermal lens forming optical element using such changes to directly modulate the intensity or frequency of light with light, or a related optical control system, has been widely conducted. For the purpose of developing new information processing technique based on a full-light type optical element, the inventors of the present invention have enthusiastically conducted a research for an optical control system using an organic nano-particle optical thermal lens forming element containing organic dye aggregate diffused in a polymer matrix (refer to T. Hiraga, N. Tanaka, K. Hayami, and T. Moriya: "generation, structural evaluation, and photophysics of dye associate and aggregate", Electronic Science and Technology Report, Vol. 59, No. 2, pp. 29-49 (1994), published by National Institute of Advanced Electronic Science and Technology, Agency of Industrial Science and Technology, Ministry of International Trade and Industry). An element presently developed by the inventors of the present invention can modulate signal light (780 nm and 1550 nm) with control light (660 nm and 980 nm) which are coaxially input to the same focus point, based on the principle that a thermal lens transiently formed by the absorption of the control light can refract the signal light. A high-speed response equivalent to approximately 20 nano-sec has been attained. There is an optical control method including emitting control light to a thermal lens forming optical element containing a photoreactive composition, reversibly changing transmissivity and/or refractive index of signal light differentiated in wavelength band from the control light, and performing intensity modulation and/or light flux density modulation for the signal light passing through the thermal lens forming optical element. For example, there is an optical control method characterized by emitting respectively converged control light and signal light into a thermal lens forming optical element and adjusting optical paths of the control light and the signal light in such a manner that highest photon density regions of the control light and the signal light in the vicinity of their focus points (beam waist) are overlapped with each other in the thermal lens forming optical element (refer to Japanese Patent Application Laid-Open No. 8-286220, Japanese Patent Application Laid-Open No. 8-320535, Japanese Patent Application Laid-Open No. 8-320536, Japanese Patent Application Laid-Open No. 9-329816, Japanese Patent Application Laid-Open No. 10-90733, Japanese Patent Application Laid-Open No. 10-90734, and Japanese Patent Application Laid-Open No. 10-148852). Furthermore, there is an optical control method including emitting control light and signal light having mutually different wavelengths into a thermal lens forming optical element containing a photoreactive composition, wherein the wavelength of the control light is selected from a wavelength band that the photoreactive composition can absorb, reversibly forming a thermal lens based on a distribution of density change caused by a temperature increase in a region where the photoreactive composition can absorb the control light or its peripheral region, and performing intensity modulation and/or light flux density modulation for the signal light passing through the thermal lens (refer to Japanese Patent Application Laid-Open No. 10-148853). A practical thermal lens forming optical element is, for example, a dye/resin film or a dye solution film. When the control light is emitted at a power level in the range from 2 through 25 mW, the response time of signal light is less than 2 µsec (refer to Japanese Patent Application Laid-Open No. 10-148853). The aforementioned methods are excellent in the capability of controlling light with light and increasing the response speed. However, a light flux shape formed when the control light is emitted becomes a doughnut shape and accordingly the coupling efficiency to an optical fiber is small.

The thermal lens effect is a phenomenon caused by a molecular that absorbs energy of light and converts light to heat at a central portion of an irradiated portion. The generated heat is propagated to the surrounding area. A temperature distribution is generated. As a result, the refractive index of a light transmission medium changes with a spherical shape from the light absorption center toward the external portion. The light absorption center has a lower refractive index, and the external portion has a higher refractive index. This distribution can produce light refraction effects similar to those of a concave lens. The thermal lens effect has been long utilized in the field of spectral analysis. A supersensitive spectral analysis available at present can detect a light absorption by a single molecular (refer to K. Fujiwara, K. Fuwa, and T. Kobayashi: laser-induced thermal lens effect and its application to colorimetric method, "Chemistry", published by Kagaku-dojin, Vo. 36, No. 6, pp 432-438 (1981), or T. Kitamori and T. Sawada: photothermo-conversion spectroscopy, "Bunseki", published by the Japan Society for Analytical Chemistry, March 1994, pp 178-187).

There is a method for realizing deflection of an optical path using a refractive index change caused by thermal lens effects or heat. According to this method, the temperature of a medium is increased by a heat-generation resistor so that deflection of light can be realized according to a change of refractive index distribution in the medium (refer to Japanese Patent Application Laid-Open No. 60-14221). However, the method discussed in the above-mentioned prior art is not free from a "divergence of heat" problem because the heat-generation resistor (i.e., heat generation element) relies on heat conduction to heat a medium. More specifically, the "divergence of heat" deteriorates formation of a finely controlled heat gradient in a wide area. Accordingly, a desired refractive index distribution cannot be obtained. Furthermore, a photolithography technique, which is preferably employed in the manufacturing of semiconductor integrated circuits, cannot be used to finely machine or process a heat-generation resistor. Due to such practical restrictions, the size of an element tends to become larger. If an element size is increased, an optical system will be structurally complicated and enlarged correspondingly. Furthermore, when a heat-generation resistor is used as a heat-generation element, the response is slow because the temperature increase of the medium is dependent on heat conduction. Furthermore, as an inherent problem, the refractive index change at higher frequencies cannot be attained.

Furthermore, a deflection element can include a thermal lens forming optical element including a photoreactive composition and an intensity distribution adjustment mechanism for irradiating the thermal lens forming optical element with a beam having a wedge-shaped light intensity distribution (refer to Japanese Patent Application Laid-Open No. 11-194373). The refractive index distribution can be formed in the thermal lens forming optical element with control light. Deflection of signal light can be realized by using the refractive index distribution. The signal light is different in wavelength from the control light. Although it is excellent to use the light to control the light, the above-described system causes a large loss of the control light for the intensity distribution adjustment mechanism that irradiates the thermal lens forming optical element with a beam having a wedge-shaped light intensity distribution. Furthermore, freely forming a wedge-shaped light intensity distribution is difficult. Thus, the optical path switching direction cannot be freely set.

Furthermore, a laser beam can be used to heat a material and change a refractive index of the material for deflection of the laser beam (refer to U.S. Pat. Nos. 4,776,677 and 4,585, 301). The methods discussed in the above-mentioned prior art documents require a laser having a large beam size and a large power to cause desirable deflection of the laser beam. The method discussed in U.S. Pat. No. 4,776,677 can cause deflection of emitted light by heat generated by the emitted light itself. If the method discussed in U.S. Pat. No. 4,776,677 is used for optical deflection, the emitted light is almost absorbed to heat a material and change a refractive index. According to the principle, only a small-quantity of light can pass through the material.

The method discussed in U.S. Pat. No. 4,585,301 uses no electrical or mechanical mechanism. An optical switch disclosed in the U.S. Pat. No. 4,585,301 can change a refractive index with an emitted control beam and change an optical path of a signal beam. However, in this case, the laser is required to have a large power to change the refractive index because no lens is used for beam-condensation of the control beam and the signal beam. Furthermore, the apparatus has a larger size. Moreover, the deflection angle cannot be enlarged because there is no mechanism for expanding a refraction change region according to traveling of a beam as proposed in the present invention.

Both U.S. Pat. Nos. 4,776,677 and 4,585,301 disclose nothing about characteristic features of the present invention that includes a mechanism for separating and condensing non-deflection light and deflection light, and a mechanism for accurately separating non-deflection light and deflection light based on a difference in incidence angle between the non-deflection light and the deflection light entering into optical fibers used for an optical detection unit.

SUMMARY OF THE INVENTION

The present invention can provide an optical deflection method and an optical deflection apparatus capable of realizing optical deflection with a small control light power, without using complicated and expensive electric circuits and mechanically movable components, extremely robust against failure, having higher durability, having extremely less polarization dependency, having less attenuation in signal light intensity, and capable of largely adjusting the deflection angle with a small control light power. Furthermore, the present invention can provide an efficient optical coupling to optical fibers which enables deflection of light while holding an energy distribution at a signal light cross section in a state capable of easily realizing convergence of light according to diffraction optics (e.g., Gauss distribution). The present invention provides a compact optical path switching apparatus and an optical path switching method capable of realizing 1-input/plural-output switching with a higher extinction ratio.

The present invention can be characterized as described below.

(1) According to one aspect of the invention, an optical deflection method includes emitting control light and signal light into a light absorption layer in a thermal lens forming optical element so that the control light and the signal light converge at different convergence points in the light absorption layer, wherein a wavelength of the control light is different from a wavelength of the signal light, the wavelength of the control light is selected from a wavelength band that the light absorption layer can absorb, and the wavelength of the signal light is selected from a wavelength band that the light absorption layer cannot absorb; and causing convergence and divergence of the control light and the signal light on an incidence plane of the light absorption layer or its vicinity in a light traveling direction, so that a thermal lens can be reversibly formed in the light absorption layer due to a temperature increase occurring in a region where the control light is absorbed and its peripheral region, and the thermal lens changes a refractive index to change a traveling direction of the signal light.

(2) According to another aspect of the invention, in the above optical deflection method, beam-condensation or convergence of the control light and the signal light is caused in a range of between 0 µm and +60 µm from the incidence plane of the light absorption layer in the light traveling direction.

(3) According to another aspect of the invention, in the above optical deflection method (1) or (2), a distance between a convergence point of the control light and a convergence point of the signal light is in a range of between 25 µm and 50 µm in a direction perpendicular to an optical axis.

(4) According to another aspect of the invention, in any one of the above optical deflection methods (1) through (3), two or more control light beams are emitted into the light absorption layer so that the traveling direction of the signal light can be changed based on a combination of the two or more control light beams.

(5) According to another aspect of the invention, an optical deflection apparatus includes a signal light source configured to emit signal light having one or more wavelengths; a control light source configured to emit control light having a wavelength different from the wavelength of the signal light; a thermal lens forming optical element including a light absorption layer configured to transmit the signal light and selectively absorb the control light; and a beam-condensing unit configured to cause beam-condensation of the control light and the signal light at different convergence points in the light absorption layer, wherein the thermal lens forming optical element causes convergence and divergence of the control light and the signal light on an incidence plane of the light absorption layer or its vicinity in a light traveling direction, wherein a thermal lens is reversibly formed in the light absorption layer due to a temperature increase occurring in a region where the control light is absorbed and its peripheral region, and the thermal lens changes a refractive index to change a traveling direction of the signal light.

(6) According to another aspect of the invention, in the above optical deflection apparatus (5), the beam-condensing unit controls both the control light and the signal light to cause beam-condensation or convergence in a range of between 0 µm and +60 µm from the incidence plane of the light absorption layer in the light traveling direction (7) According to another aspect of the invention, in the above optical deflection apparatus (5) or (6), the beam-condensing unit controls a distance between a convergence point of the control light and a convergence point of the signal light to remain within a range of between 25 μm and 50 μm in a direction perpendicular to an optical axis.

(8) According to another aspect of the invention, in any one of the above optical deflection apparatus (5) through (7), the control light source emits two or more control light beams, and the beam-condensing unit causes beam-condensation or convergence of the two or more control light beams in the light absorption layer so as to have different convergence points.

(9) According to another aspect of the invention, an optical path switching method includes selecting emission of control light according to desired information; emitting the control light and signal light into a light absorption layer in a thermal lens forming optical element so that the control light and the signal light converge at different convergence points in the light absorption layer in a direction perpendicular to an optical axis, wherein a wavelength of the control light is different from a wavelength of the signal light, the wavelength of the control light is selected from a wavelength band that the light absorption layer can absorb, and the wavelength of the signal light is selected from a wavelength band that the light absorption layer cannot absorb; causing convergence and divergence of the control light and the signal light on an incidence plane of the light absorption layer or its vicinity in a light traveling direction, so that a thermal lens can be reversibly formed in the light absorption layer due to a temperature increase occurring in a region where the control light is absorbed and its peripheral region, and the thermal lens changes a refractive index to change a traveling direction of the signal light; and separately outputting first signal light having a traveling direction not changed by the emission of the control light and second signal light having a traveling direction changed by the emission of the control light depending on respective traveling directions.

(10) According to another aspect of the invention, in the above optical path switching method (9), beam-condensation or convergence of the control light and the signal light is caused on the incidence plane of the light absorption layer or in the light absorption layer in the light traveling direction.

(11) According to another aspect of the invention, in the above optical path switching method (9) or (10), the first signal light having a traveling direction not changed by the emission of the control light and the second signal light having a traveling direction changed by the emission of the control light are separated by a mirror.

(12) According to another aspect of the invention, in any one of the above optical path switching methods (9) through (11), the first signal light having a traveling direction not changed by the emission of the control light and the second signal light having a traveling direction changed by the emission of the control light are beam-condensed by a lens and directed into a detection unit.

(13) According to another aspect of the invention, in the above optical path switching method (12), the detection unit is an optical fiber that can receive the first signal light and the second signal light from the lens.

(14) According to another aspect of the invention, in above optical path switching method (13), the first signal light and the second signal light having entered the optical fiber from the lens have optical axes forming an angle two times or more greater than a maximum incidence angle that the optical fiber can propagate.

(15) According to another aspect of the invention, in any one of the above optical path switching methods (9) through (14), plural control light beams are emitted to the light absorption layer according to an optical path switching number, and plural signal light beams are output according to the optical path switching number by changing the traveling direction of the signal light based on a combination of plural control light beams.

(16) According to another aspect of the invention, an optical path switching apparatus includes a signal light source configured to emit signal light having one or more wavelengths; a control light source configured to emit control light having a wavelength different from the wavelength of the signal light; a thermal lens forming optical element including a light absorption layer configured to transmit the signal light and selectively absorb the control light; and a beam-condensing unit configured to cause beam-condensation of the control light and the signal light at different convergence points in the light absorption layer in a direction perpendicular to an optical axis, wherein the thermal lens forming optical element causes convergence and divergence of the control light and the signal light on an incidence plane of the light absorption layer or its vicinity in a light traveling direction, wherein a thermal lens is reversibly formed in the light absorption layer due to a temperature increase occurring in a region where the control light is absorbed and its peripheral region, and the thermal lens changes a refractive index to change a traveling direction of the signal light, wherein the optical path switching apparatus further includes an output unit configured to separately output first signal light having a traveling direction not changed by the emission of the control light and second signal light having a traveling direction changed by the emission of the control light depending on respective traveling directions.

(17) According to another aspect of the invention, in the above optical path switching apparatus (16), the beam-condensing unit causes beam-condensation or convergence of the light on the incidence plane of the light absorption layer or in the light absorption layer in the light traveling direction.

(18) According to another aspect of the invention, in the above optical path switching apparatus (16) or (17), the output unit is a mirror.

(19) According to another aspect of the invention, in any one of the above optical path switching apparatus (16) through (18), a detection unit is further provided to receive the first signal light having a traveling direction not changed by the emission of the control light and the second signal light having a traveling direction changed by the emission of the control light which are beam-condensed by a lens.

(20) According to another aspect of the invention, in the above optical path switching apparatus (19), the detection unit is an optical fiber.

(21) According to another aspect of the invention, in the above optical path switching apparatus (20), the first signal light and the second signal light having entered the optical fiber from the lens have optical axes forming an angle two times or more greater than a maximum incidence angle that the optical fiber can propagate.

(22) According to another aspect of the invention, in any one of the above optical path switching apparatus (16) through (21), wherein the control light source emits two or more control light beams according to an optical path switching number, and the beam-condensing unit changes convergence points of the plural control light beams relative to the optical axis in a vertical direction to cause different convergence or cause beam-condensation in the light absorption layer.

(23) According to another aspect of the invention, an optical path switching method includes selecting emission of control light according to desired information; emitting the control light and signal light into a light absorption layer in a thermal lens forming optical element so that the control light and the signal light converge at different convergence points in the light absorption layer in a direction perpendicular to an optical axis, wherein a wavelength of the control light is different from a wavelength of the signal light, the wavelength of the control light is selected from a wavelength band that the light absorption layer can absorb, and the wavelength of the signal light is selected from a wavelength band that the light absorption layer cannot absorb; and causing convergence and divergence of the control light and the signal light on an incidence plane of the light absorption layer or its vicinity in a light traveling direction, so that a thermal lens can be reversibly formed in the light absorption layer due to a temperature increase occurring in a region where the control light is absorbed and its peripheral region, and the thermal lens changes a refractive index to change a traveling direction of the signal light, and detecting first signal light having a traveling direction not changed by the emission of the control light and second signal light having a traveling direction changed by the emission of the control light which are beam-condensed or converged by a same optical system.

(24) According to another aspect of the invention, in the above optical path switching method (23), beam-condense or convergence of the control light and the signal light is caused in the light absorption layer in the light traveling direction.

(25) According to another aspect of the invention, in the above optical path switching method (23) or (24), the first signal light having a traveling direction not changed by the emission of the control light and the second signal light having a traveling direction changed by the emission of the control light have convergence points in the light absorption layer which are mutually separated as virtual convergence points.

(26) According to another aspect of the invention, in any one of the above optical path switching methods (23) through (25), the first signal light having a traveling direction not changed by the emission of the control light and the second signal light having a traveling direction changed by the emission of the control light are beam-condensed or converged by a same lens and received by an optical fiber.

(27) According to another aspect of the invention, in any one of the above optical path switching methods (23) through (26), plural control light beams are emitted to the light absorption layer according to an optical path switching number, and the traveling direction of the signal light is changed based on a combination of the plural control light beams, wherein plural signal light beams according to the optical path switching number and signal light not subjected to change of signal direction are converged or beam-condensed to the optical detection unit.

(28) According to another aspect of the invention, in any one of the above optical path switching methods (25) through (27), a distance between virtual convergence points of the signal light entering the optical fiber without change of signal direction and one or more signal lights subjected to switching of optical path in the light absorption layer is equal to a value obtained by dividing a distance between the light-receiving optical fibers by a lens magnification.

(29) According to another aspect of the invention, an optical path switching apparatus includes a signal light source configured to emit signal light having one or more wavelengths; a control light source configured to emit control light having a wavelength different from the wavelength of the signal light; a thermal lens forming optical element including a light absorption layer configured to transmit the signal light and selectively absorb the control light; and a beam-condensing unit configured to cause beam-condensation of the control light and the signal light at different convergence points in the light absorption layer in a direction perpendicular to an optical axis, wherein the thermal lens forming optical element causes convergence and divergence of the control light and the signal light on an incidence plane of the light absorption layer or its vicinity in a light traveling direction, wherein a thermal lens is reversibly formed in the light absorption layer due to a temperature increase occurring in a region where the control light is absorbed and its peripheral region, and the thermal lens changes a refractive index to change a traveling direction of the signal light, wherein the optical path switching apparatus further includes an optical detection unit configured to receiving first signal light having a traveling direction not changed by the emission of the control light and second signal light having a traveling direction changed by the emission of the control light which are beam-condensed or converged by a same optical system.

(30) According to another aspect of the invention, in the above optical path switching apparatus (29), the beam-condensing unit causes beam-condensation or convergence of the control light and the signal light in the light absorption layer in the light traveling direction.

(31) According to another aspect of the invention, in the above optical path switching apparatus (29) or (30), the thermal lens formed in the light absorption layer of the thermal lens forming optical element causes the first signal light having a traveling direction not changed by the emission of the control light and the second signal light having a traveling direction changed by the emission of the control light to have convergence points in the light absorption layer which are mutually separated as virtual convergence points.

(32) According to another aspect of the invention, in any one of the above optical path switching apparatus (29) or (31), the detection unit is an optical fiber.

(33) According to another aspect of the invention, in the above optical path switching apparatus (31) or (32), a distance between virtual convergence points of the signal light entering the optical fiber without change of signal direction and one or more signal lights subjected to switching of optical path in the light absorption layer is equal to a value obtained by dividing a distance between the light-receiving optical fibers by a lens magnification.

(34) According to another aspect of the invention, in any one of the above optical path switching apparatus (29) through (33), the control light source emits two or more control light beams according to an optical path switching number, and the beam-condensing unit changes convergence points of the plural control light beams relative to the optical axis in a vertical direction to cause different convergence or cause beam-condensation in the light absorption layer.

BRIEF DESCRIPTION OF THE DRAWINGS

FIG. 22 illustrates optical path switching measurement data.

FIG. 30 illustrates optical path switching measurement data.

DESCRIPTION OF PREFERRED EMBODIMENT

Embodiments of the present invention are described below with reference to the drawings.

First Embodiment

Figure 1:
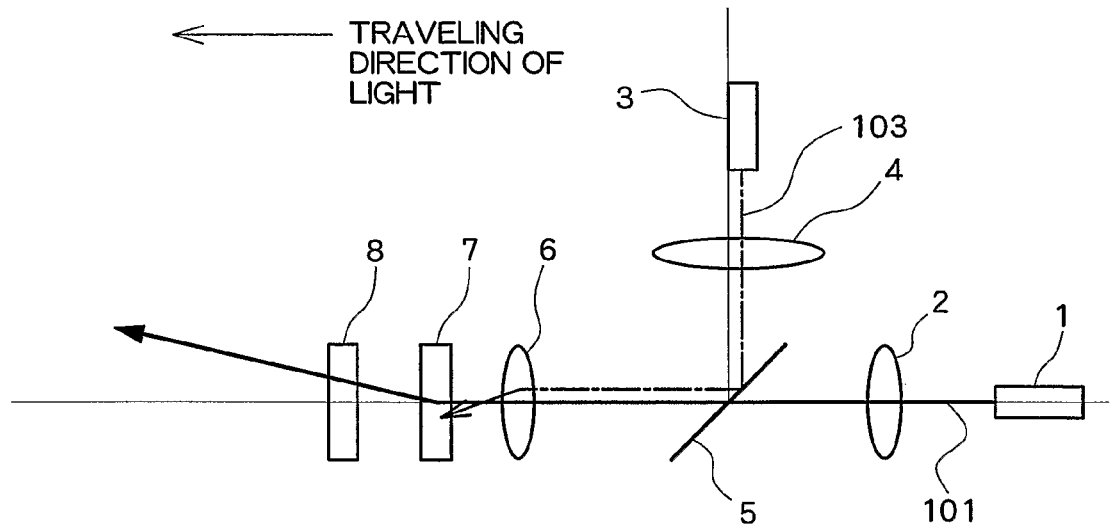
FIG. 1 illustrates an optical deflection apparatus according to a first embodiment of the present invention.

FIG. 1 illustrates an arrangement of an optical deflection apparatus according to a first embodiment of the present invention. The optical deflection apparatus according to the first embodiment of the present invention includes a signal light incidence terminal 1 serving as a signal light source, a first collimation lens 2 that can change signal light 101 into a parallel beam, a control light incidence terminal 3 serving as a control light source, a second collimation lens 4 that can change control light 103 into a parallel beam, an optical mixer 5 that can mix the signal light 101 and the control light 103, a collective lens 6 (i.e., beam-condensing unit) that can condense both the signal light 101 and the control light 103 to a light absorption layer of a thermal lens forming optical element 7, and a wavelength selective transmission filter 8.

Although not shown in this drawing, the signal light incidence terminal 1 receives the signal light 101 via an optical fiber. The signal light 101 has a wavelength equal to 1550 nm. Any other signal light having a wavelength capable of reaching the light absorption layer of the thermal lens forming optical element 7 can be used. Alternatively, it may be preferable that the thermal lens forming optical element 7 possesses absorption spectral characteristics capable of transmitting signal light 101 having the selected wavelength. According to the present embodiment, instead of using an optical fiber, a laser beam source capable of emitting signal light 101 can be directly attached to the signal light incidence terminal 1.

In an optical deflection method and an optical deflection apparatus according to the present invention, the light absorption layer in the thermal lens forming optical element can be appropriately selected according to the purpose of use. For example, material, signal light wavelength band, and control light wavelength band can be appropriately combined and determined according to the purpose of use. For example, a signal light wavelength or a signal light wavelength band can be first determined according to the purpose of use. Then, a light absorption layer film material and a control light wavelength can be appropriately combined. Alternatively, a combination of a signal light wavelength and a control light wavelength can be first determined according to the purpose of use. Then, a light absorption layer film material can be appropriately selected. For example, an image and characters can be directly displayed using a visible ray having a wavelength from 400 nm to 800 nm serving as signal light and an infrared ray having a wavelength 980 nm serving as control light. In this case, a light absorption layer is made of a material capable of transmitting the visible ray and absorbing the infrared ray. Furthermore, control light can be selected from any light having a wavelength corresponding to the longest wavelength λ1 (absorption maximum in the light absorption spectra) of a selected light absorption layer material and signal light can be selected from any light having a wavelength longer than λ1. For example, when the light absorption layer material is perylene, the wavelength of the control light may be 405 nm and the wavelength of the signal light may be 540 nm, 660 nm, 780 nm, 830 nm, 980 nm, 1310 nm, or 1550 nm. In another example, when the light absorption layer material is copper phthalocyanine derivative, the wavelength of the control light may be 650 nm and the wavelength of the signal light may be 690 nm, 780 nm, 830 nm, 980 nm, 1310 nm, or 1550 nm.

Although not shown in this drawing, the control light incidence terminal 3 receives the control light 103 via an optical fiber. Here, the wavelength of the control light 103 is 980 nm, but any other wavelength capable of reaching the light absorption layer of the thermal lens forming optical element 7 can be used. According to the present embodiment, instead of using an optical fiber, a laser beam source capable of emitting control light 103 can be directly attached to the control light incidence terminal 3.

Each of the first collimation lens 2 and the second collimation lens 4 is an aspherical lens having a focal length equal to 8 mm, although a more compact optical deflection apparatus can be realized by using a lens having a focal length shorter than 8 mm. Using aspherical lenses can help realize a more compact and lightweight device. However, any suitable lenses may be selected for the first collimation lens 2 and the second collimation lens 4.

The optical mixer 5 is a dichroic mirror that can transmit signal light and reflect control light. The signal light incidence terminal and the control light incidence terminal can be mutually replaced in position, so that the signal light can reflect on the optical mixer 5 and the control light can penetrate the optical mixer 5 if a selected dichroic mirror has such characteristics.

The collective lens 6 is an aspherical lens having a focal length equal to 8 mm, although it should be obvious that a more compact optical deflection apparatus can be realized by using a lens having a focal length shorter than 8 mm. Using aspherical lenses can help realize a more compact and lightweight device. However, any appropriate lens may be selected for the collective lens 6.

Figure 13A:
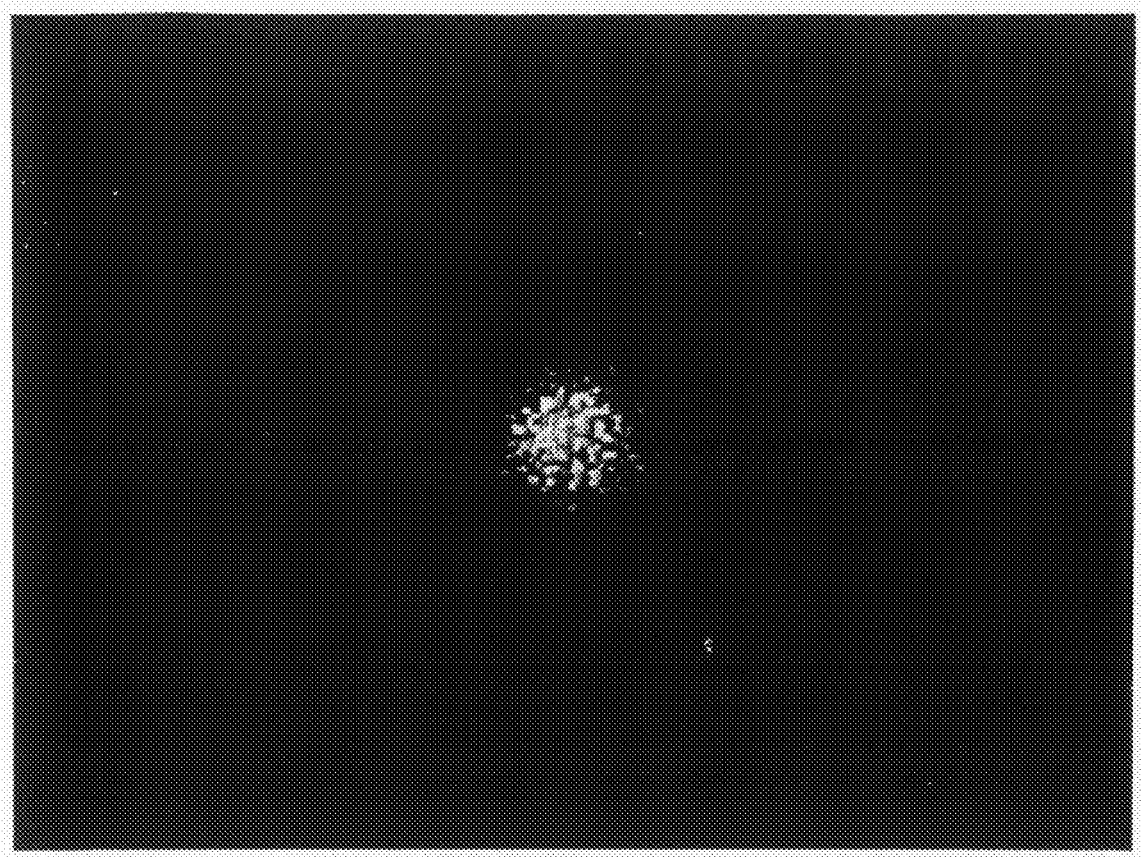
FIG. 13a is a cross-sectional illustration of signal light observed when no control light is emitted.
Figure 13B:
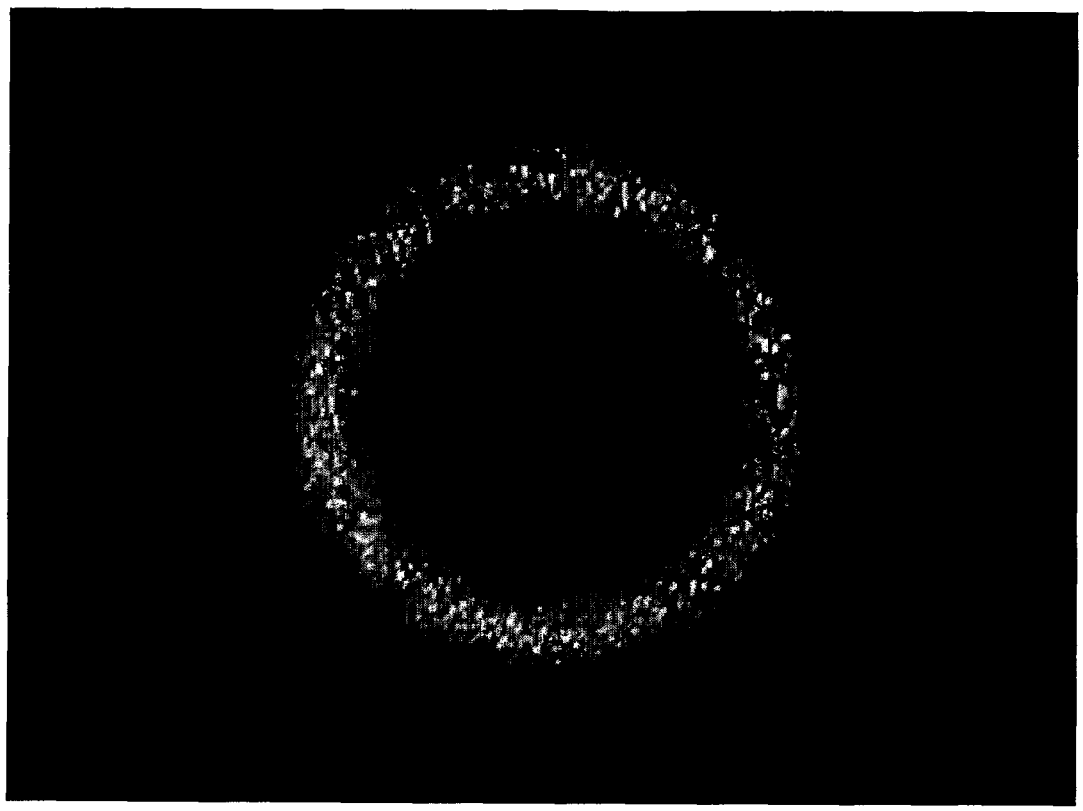
FIG. 13b is a cross-sectional illustration of signal light observed when control light is emitted.

The collective lens 6 can cause both the signal light and the control light to converge on an incidence plane of the light absorption layer or its vicinity in the light traveling direction. When convergence (beam-condensation) of the signal light and the control light is caused at the same point in the vicinity of the incidence plane of a light absorption layer, the signal light expands with a doughnut shape, as shown in FIGS. 13*a* and 13*b*. If no control light is emitted, the beam of the signal light is round (refer to photograph 1*a* shown in FIG. 13*a*). On the other hand, FIG. 13*b* is photograph 1*b* obtained when both control light and signal light are emitted to the same point. It is presumed that the doughnut shape is clearly and largely formed on the incidence plane of a light absorption layer. In other words, the incidence plane of a light absorption layer is the place where a doughnut shape can be clearly and largely formed. In the present embodiment, no doughnut shape is formed because convergence (beam-condensing) points of the signal light and the control light are spaced by a distance of 25 to 50 µm. However, in a process of adjustment, both the signal light and the control light are emitted to the same point to form a doughnut shape. Then, the convergence (beam-condensing) points of the signal light and the control light are separated. If the distance between the convergence points of the signal light and the control light is less than 25 µm, the circular beams shown in FIGS. 13*a* and 13*b* cannot be obtained. The shape of the light becomes a crescent beam. If the signal light is a crescent beam and the beam-condensed signal light is input to an optical fiber or into a small hole, an information amount will decrease and cannot be practically used. Furthermore, the signal light of a crescent beam cannot be used to display an image and/or characters based on deflection of the beam as intended.

Figure 5:
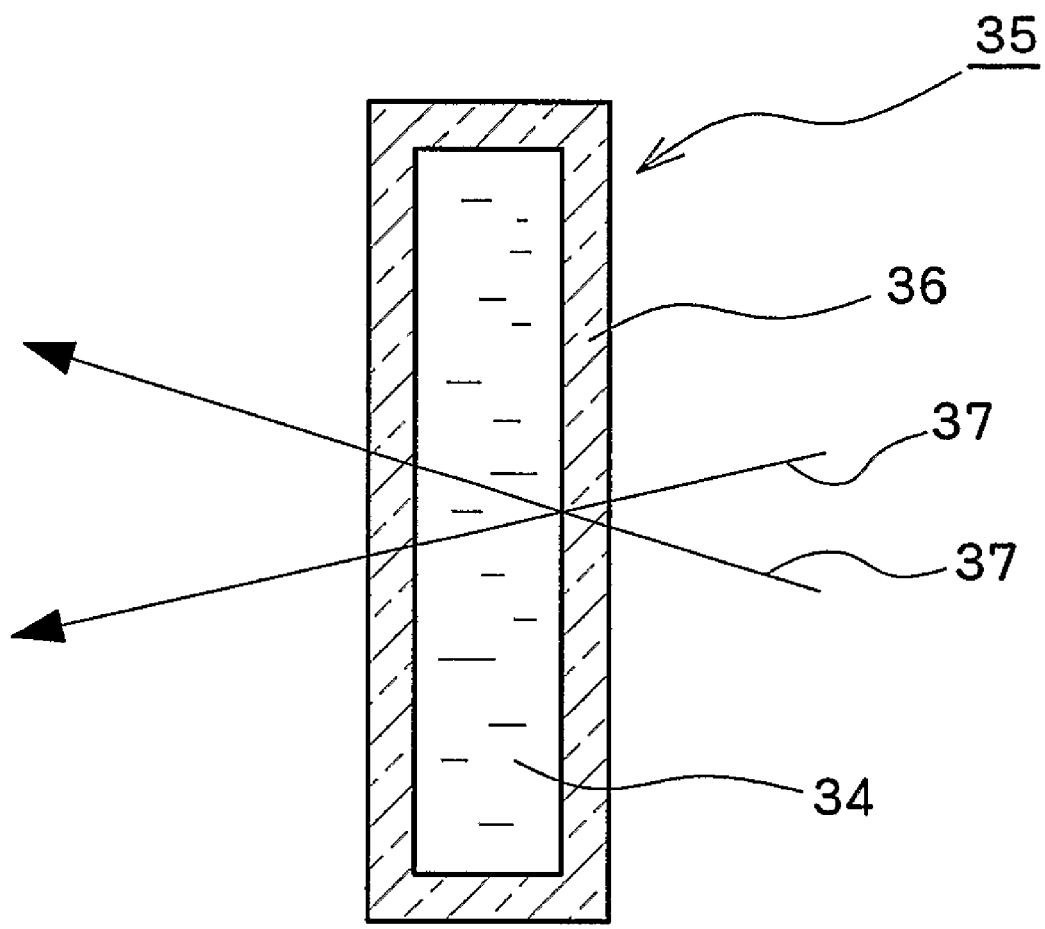
FIG. 5 illustrates an example of a thermal lens forming optical element.

FIG. 5 illustrates an exemplary arrangement of the thermal lens forming optical element 7. In the present embodiment, to simplify the description, only a light absorption layer is shown in the drawing. In FIG. 5, a thermal lens forming optical element 35 has a light absorption layer 34 including dye dissolved in a solvent and sealed by a glass container 36. The dye soluble in a solvent can be any dye which has an absorption region corresponding to the wavelength of selected control light and has a non-absorption region corresponding to the wavelength of selected signal light. The glass container 36, through which the laser beam 37 can travel, has a glass thickness equal to approximately 500 µm. The light absorption layer 34 has a thickness of 200 to 1000 µm. For example, the dye can be selected from xanthene dye (rhodamine B, rhodamine 6G, eosine, phloxine B, etc), acridine dye (acridine orange, acridine red, etc), azo dye (ethyl red, methyl red, etc), porphyrin dye, phthalocyanine dye, cyanine dye (3,3'-diethyl-thiacarbocyanine-iodide, 3,3'-diethyl-oxadicarbocyanine-iodide, etc), triarylmethane dye (ethyl-violet, Victoria blue R, etc), naphthoquinone dye, anthraquinone dye, naphthalene-tetracarboxylate-diimide dye, and perylene-tetracarboxylate-diimide dye. The dye used in the present invention can be a mixture of two or more different dyes. The solvent used in the present invention can be any solution which can dissolve the selected dyes and remain stable against temperature increases in the thermal lens forming process, without decomposing. Furthermore, the solvent used in the present invention has a boiling temperature (boiling point) equal to or greater than 100° C., preferably equal to or greater than 200° C., more preferably equal to or greater than 300° C. For example, the solvent can be an inorganic solvent (sulfate, etc) or an organic solvent selected from halogenated aromatic hydrocarbon-group (e.g., o-dichlorobenzene, etc), aromatic substituted aliphatic hydrocarbon-group (1-phenyl-1-xylylethane, or 1-phenyl-1-ethylpheny-1-ethane, etc), and nitrobenzenederivative-group (nitrobenzene, etc).

The wavelength selective transmission filter 8 is a dielectric filter that can shield control light, if the control light has passed through the thermal lens forming optical element 7, and can transmit signal light. However, if the thermal lens forming optical element 7 is capable of sufficiently absorbing control light, the wavelength selective transmission filter 8 can be removed.

The control light is absorbed by the light absorption layer in thermal lens forming optical element 7. In the light absorption layer, the temperature increases and the refractive index changes. An increase of temperature generally causes reduction in the refractive index. The distribution of light of a laser beam emitted from an ordinary laser beam source, or a laser beam emitted from an ordinary laser beam source and transmitted via an optical fiber, forms a Gaussian pattern. The distribution of light of a laser beam having which has passed through a beam-condensed lens also forms a Gaussian pattern. Therefore, in the refractive index distribution obtainable when the light absorption layer is irradiated with control light, the refractive index is minimized at an optical axis of the control light. On the other hand, in the periphery of the control light, reduction of the refractive index is relatively small. Furthermore, due to heat conduction, the refractive index may change in a region not irradiated with the light.

Figure 4A:
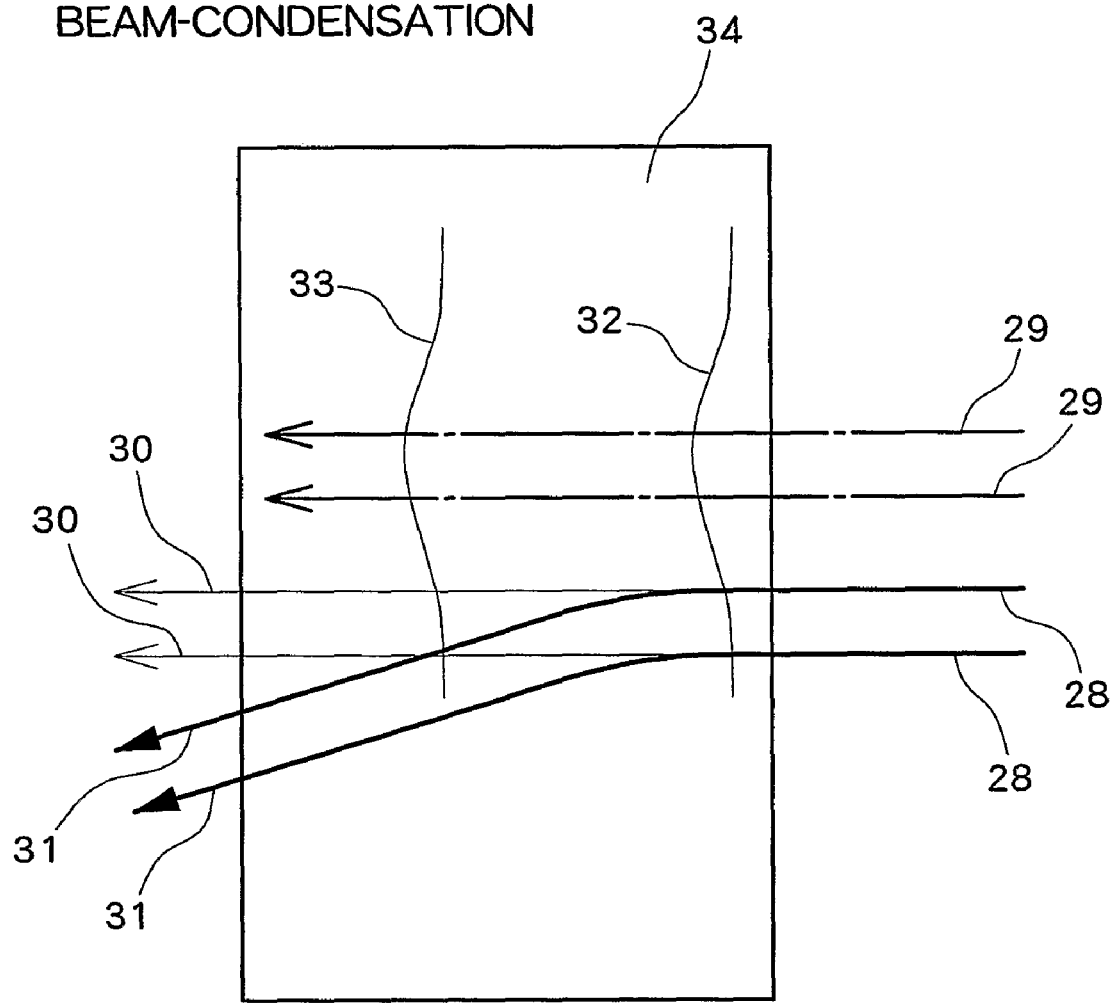
FIG. 4a illustrates deflection of signal light.
Figure 4B:
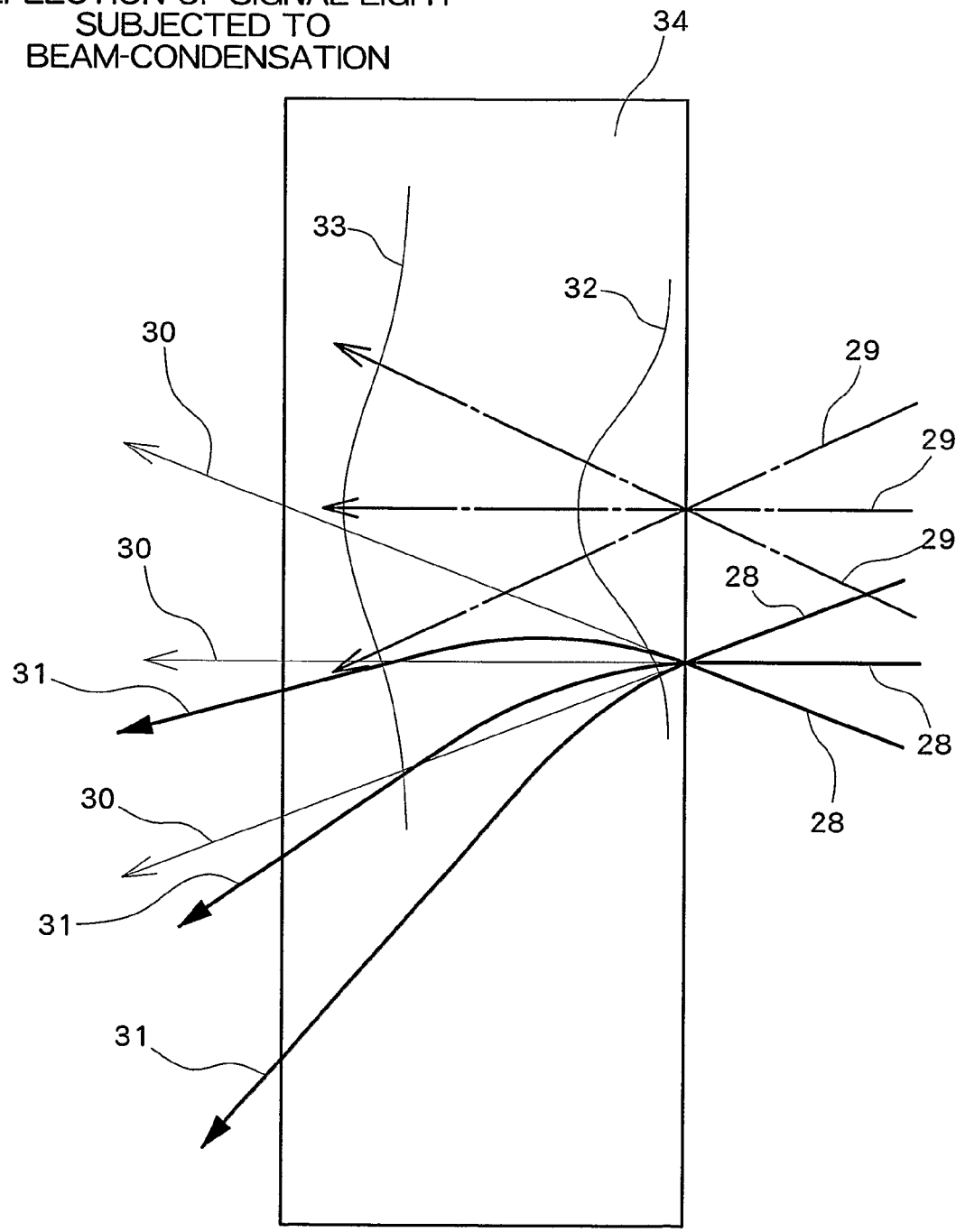
FIG. 4b illustrates deflection of signal light.

FIGS. 4*a* and 4*b* illustrate exemplary deflection of signal light. To simplify the description, FIGS. 4*a* and 4*b* disregard light refractions caused by the difference in refractive index between the light absorption layer and its surrounding substance. In FIGS. 4*a* and 4*b*, signal light 28 and control light 29 are emitted to a light absorption layer 34 of the thermal lens forming optical element. If no control light is emitted, the signal light travels straight in the thermal lens forming optical element (refer to an arrow 30). If control light is emitted, the signal light is deflected in the thermal lens forming optical element (refer to an arrow 31). The control light has a light intensity distribution 32 in the vicinity of an incidence plane of the light absorption layer 34 and a light intensity distribution 33 in the vicinity of an output plane of light absorption layer 34.

FIG. 4*a* illustrates an optical path of a laser beam not subjected to beam condensation, while FIG. 4*b* illustrates an optical path of a laser beam subjected to beam condensation.

The intensity distribution region of a laser beam not subjected to beam condensation shows no variation, while the laser beam travels in the light absorption layer from the incidence plane to the output plane. In other words, the signal light traveling in the light absorption layer can pass a region where the refractive index does not significantly change. On the other hand, a laser beam subjected to beam condensation has an intensity distribution region largely varying while the laser beam travels in the light absorption layer from the incidence plane to the output plane. In other words, the refractive index gradually expands and deflection of the signal light is caused when the light travels in the light absorption layer. The degree of refractive index change is proportional to a control light power. The change in the refractive index gradually decreases when the light travels in the light absorption layer.

According to the example shown in FIG. 4b, the signal light causes convergence (beam-condensation) on the incidence plane of the light absorption layer 34 of the thermal lens forming optical element. However, the convergence (beam-condensing) point of the signal light can be anywhere in the vicinity of the incidence plane. More specifically, the convergence (beam-condensing) point of the signal light can be slightly offset toward the output plane of the light absorption layer. Furthermore, according to the example shown in FIG. 4b, the signal light and the control light enter the same surface in the light traveling direction. However, the signal light and the control light can enter from different surfaces.

In the present embodiment, the signal light having a wavelength equal to 1550 nm is input to the signal light incidence terminal via a single-mode quartz optical fiber having a core diameter equal to 9.5 μm. The control light having a wavelength equal to 980 nm is input to the control light incidence terminal via a single-mode quartz optical fiber having a core diameter equal to 9.5 μm. The signal light and the control light are changed into parallel beams by the first collimation lens and the second collimation lens each having a focal length equal to 8 mm. Then, the light converged (beam-condensed) by the lens having a focal length equal to 8 mm enters into a thermal lens forming optical element. The thermal lens forming optical element includes a light absorption layer having a thickness equal to 500 μm. The transmissivity of the light absorption layer is 95% at a wavelength equal to 1550 nm and 0.2% at a wavelength equal to 980 nm.

The deflection angle of the light varies according to the following conditions:

1. positional relationship of the signal light and the control light relative to a convergence (beam-condensation) point of the first collective lens 6 in the light absorption layer of the thermal lens forming optical element;
2. power of the control light;
3. position of the control light (distance between the signal light and the control light at the beam-condensing point of the first collective lens 6 in a direction perpendicular to an optical axis);
4. thickness of the light absorption layer in the thermal lens forming optical element;
5. wavelength of the control light and wavelength of the signal light; and
6. dye concentration in the light absorption layer. Furthermore, the deflection angle of the light changes depending on a material of the light absorption layer or depending on a convergence (beam-condensing) angle of the control light and the signal light entering in the light absorption layer.

Figure 6:
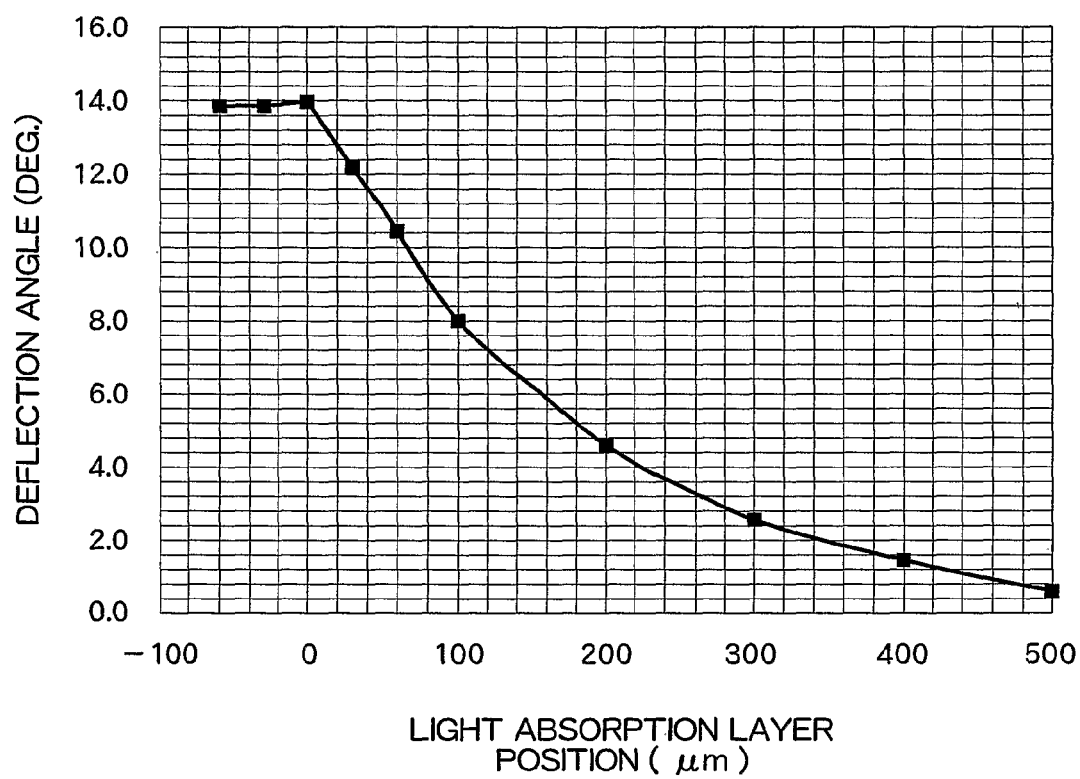
FIG. 6 is a graph illustrating a relationship between light absorption layer position and deflection angle.

FIG. 6 shows a relationship between "light absorption layer position" and deflection angle. Here, "light absorption layer position" represents the incidence position of the convergence (beam-condensing) point of the signal light and the control light entering the light absorption layer 34 of the thermal lens forming optical element 7 shown in FIG. 4b. In FIG. 6, an abscissa is the light absorption layer position representing the incidence position of the light entering the light absorption layer 34 of the thermal lens forming optical element 7 (i.e., position of the control light and the signal light relative to the convergence (beam-condensing) point). The 0-point corresponds to the condition shown in FIG. 4b where the light incidence plane position of the light absorption layer 34 in the thermal lens forming optical element 7 agrees with the convergence (beam-condensing) point of the control light and the signal light. In FIG. 6, a minus direction represents a light traveling direction. At a plus position, convergence (beam-condensation) of the signal light and the control light is caused in the light absorption layer 34 of the thermal lens forming optical element 7. The ordinate represents the deflection angle. The example used for obtaining the data shown in FIG. 6 has a control light power equal to or near 12.9 mW. The control light position (i.e., distance between the signal light and the control light at the beam-condensing point in a direction perpendicular to the optical axis) is 35 μm. The light absorption layer has a thickness equal to 500 μm. The transmissivity of the light absorption layer is 95% at a wavelength equal to 1550 nm and 0.2% at a wavelength equal to 980 nm.

When the light incidence position relative to the light absorption layer 34 is smaller than 0, the light having a circular beam shape is changed to light having a crescent beam shape. When the thermal lens forming optical element position is smaller than −65 μm, deflected light has a beam shape which is largely deformed and cannot be measured. If the light absorption layer position is greater than 0, deformation of a beam shape is small.

However, as apparent from FIG. 6, if the light absorption layer position is greater than 0, the deflection angle becomes smaller. The light incidence plane position of the light absorption layer 34 can be 0 (refer to the condition shown in FIG. 4b). If the light incidence plane position of the light absorption layer 34 is greater than 0, the convergence (beam-condensation) of the light is caused in the light absorption layer. The deflection angle resulting from expansion of the control light beam is smaller that the deflection angle shown in FIG. 4b.

Figure 7:
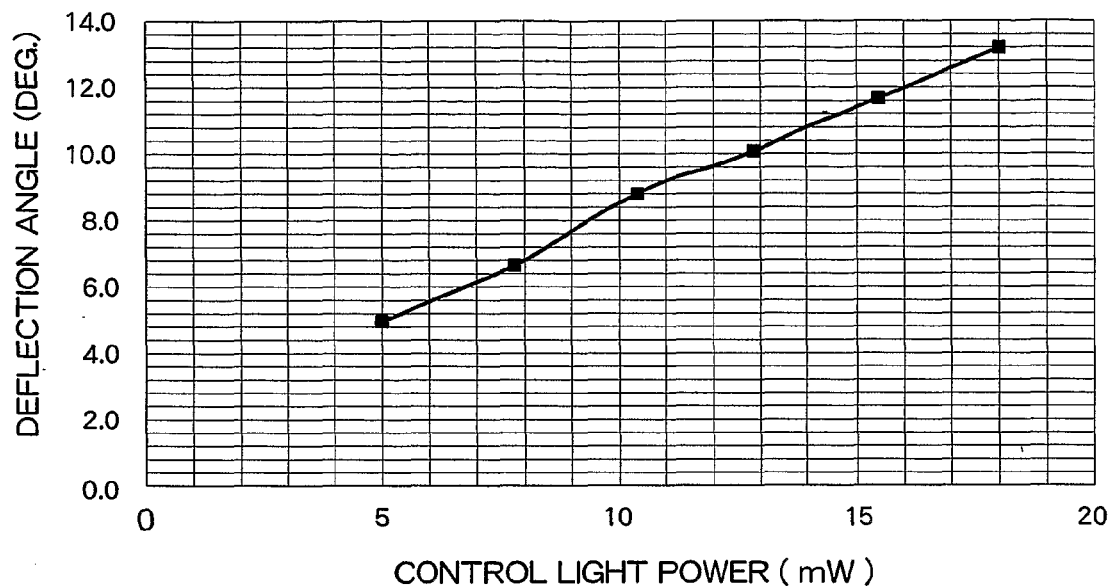
FIG. 7 is a graph illustrating a relationship between control light power and deflection angle.

FIG. 7 shows an exemplary relationship between control light power and deflection amount (deflection angle). The deflection amount (deflection angle) is proportional to the control light power. Thus, the deflection amount (deflection angle) can be adjusted to a desired value by selecting an appropriate value of the control light power. According to the example used for obtaining the data shown in FIG. 7, the control light position (i.e., distance between the signal light and the control light at the beam-condensing point in a direction perpendicular to the optical axis) is 35 μm. The light absorption layer position, representing the incidence position of the convergence (beam-condensing) point of the signal light and the control light entering the light absorption layer 34 of thermal lens forming optical element 7, is 60 μm. The light absorption layer 34 has a thickness equal to 500 μm. The transmissivity of the light absorption layer is 95% at a wavelength equal to 1550 nm and 0.2% at a wavelength equal to 980 nm.

Figure 8:
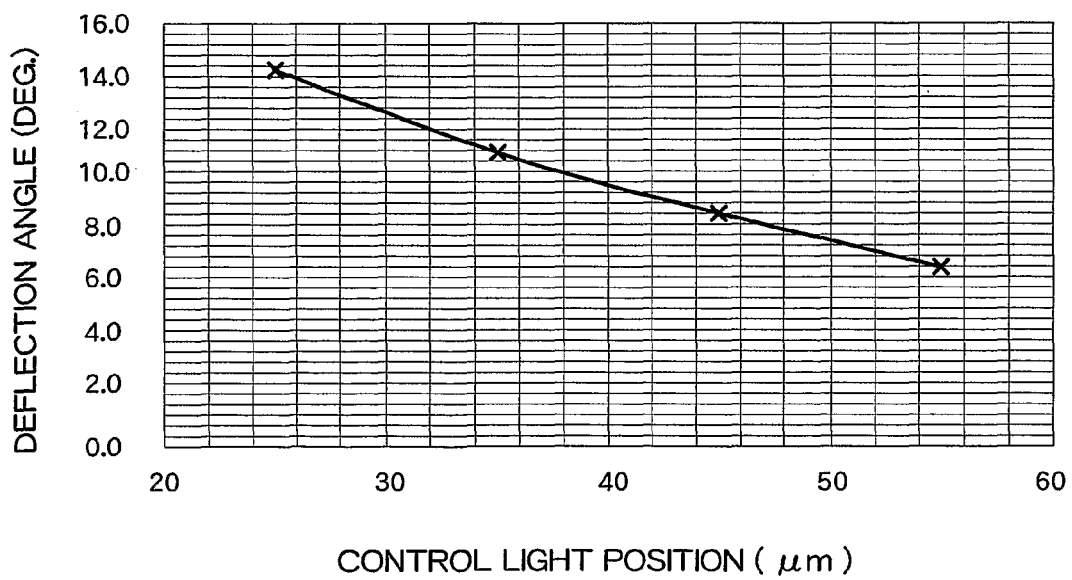
FIG. 8 is a graph illustrating a relationship between control light position and deflection angle.

FIG. 8 shows an exemplary relationship between control light position (i.e., distance between the signal light and the control light at the beam-condensing point in a direction perpendicular to the optical axis) and deflection amount (deflection angle). When the control light position (i.e., distance between the signal light and the control light at the beam-condensing point in a direction perpendicular to the optical axis) becomes larger, the deflection angle becomes smaller. On the contrary, when the control light position becomes smaller, the deflection angle becomes larger. If the control light position is smaller than 25 μm, deflected light has a crescent beam shape. According to the example used for obtaining the data shown in FIG. 8, the light absorption layer position is 60 μm, the control light power is 12.9 mW, and the light absorption layer has a thickness equal to 500 μm. The transmissivity of the light absorption layer is 95% at a wavelength equal to 1550 nm and 0.2% at a wavelength equal to 980 nm.

Figure 9:
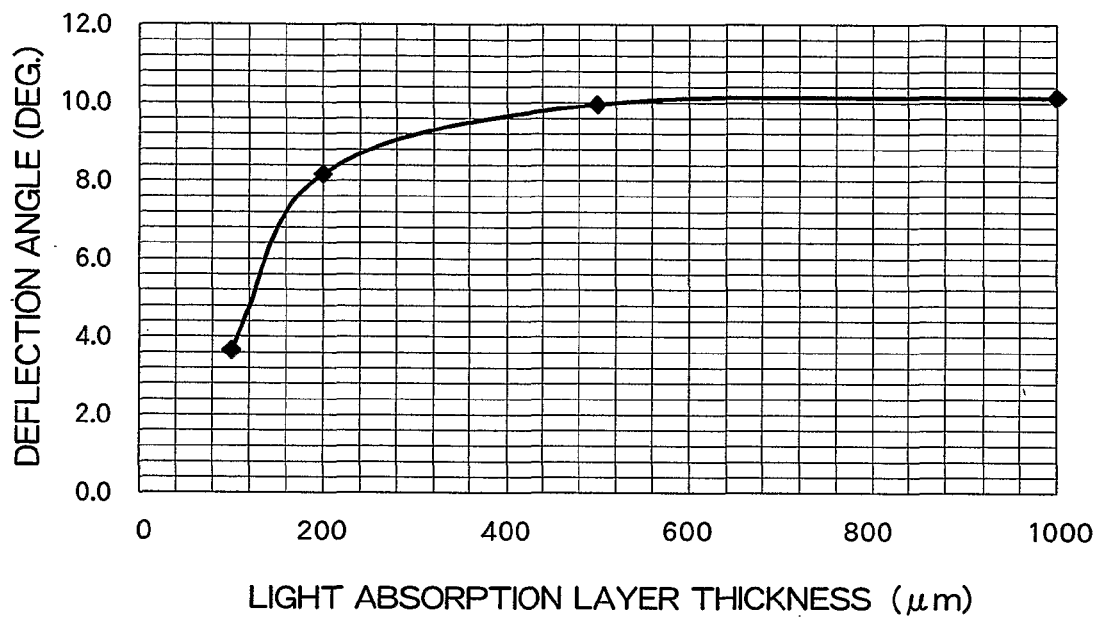
FIG. 9 is a graph illustrating a relationship between light absorption layer thickness and deflection angle.

FIG. 9 shows an exemplary relationship between light absorption layer thickness and deflection angle. According to the example used for obtaining the data shown in FIG. 9, the transmissivity of the light absorption layer is 95~80% at a wavelength equal to 1550 nm and 24% to 0.2% at a wavelength equal to 980 nm. First, the deflection angle rapidly increases before the thickness of the light absorption layer reaches approximately 200 μm. Then, the increase of the deflection angle slows. And, the deflection angle is almost constant when the thickness of the light absorption layer exceeds 500 μm. Furthermore, according to the example used for obtaining the data shown in FIG. 9, the light absorption layer position is 60 μm, the control light power is 12.9 mW, and the control light position (i.e., distance between the signal light and the control light at the beam-condensing point in a direction perpendicular to the optical axis) is 35 μm.

Figure 10:
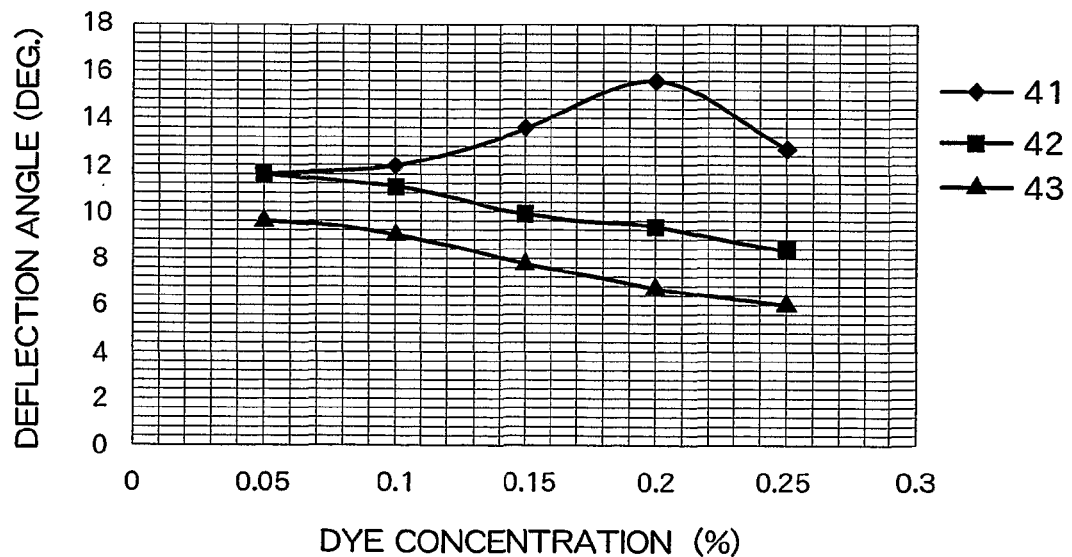
FIG. 10 is a graph illustrating a relationship between dye concentration and deflection angle.

FIG. 10 shows an exemplary relationship between dye concentration (in the light absorption layer) and deflection angle. In FIG. 10, regardless of dye concentration, the transmissivity of the light absorption layer is approximately 0.2% at a wavelength equal to 1550 nm. Furthermore, the transmissivity of the light absorption layer at wavelengths equal to 980 nm is 7.3%, 0.85%, 0.11%, 0.068%, and 0.03% when the dye concentration is 0.05%, 0.1%, 0.15%, 0.2%, and 0.25%, respectively. In FIG. 10, line 41 (i.e., a solid line connectin-polished points) represents deflection angle data obtained when the incidence position (i.e., the light absorption layer position) of the convergence (beam-condensing) point of the control light and the signal light entering the light absorption layer 34 is just on the light incidence plane position of the light absorption layer 34 (i.e., light absorption layer position=0 μm). Furthermore, line 42 (i.e., a solid line connecting rectangular points) represents deflection angle data obtained when the incidence position of the convergence (beam-condensing) point of the control light and the signal light is offset by approximately 60 μm from the light incidence plane position of the light absorption layer 34 (i.e., light absorption layer position=60 μm). Moreover, line 43 (i.e., a solid line connecting triangular points) represents deflection angle data obtained when the incidence position of the convergence (beam-condensing) point of the control light and the signal light is offset by approximately 100 μm from the light incidence plane position of the light absorption layer 34 (i.e., light absorption layer position=100 μm). According to the line 41 (light absorption layer position=0 μm), the deflection angle is maximized at the dye concentration of 0.2%. However, this tendency is not confirmed when the offset amount is increased (i.e., light absorption layer position=60 μm or 100 μm). As indicated by the lines 42 and 43, the deflection angle monotonously decreases. According to the example used for obtaining the data shown in FIG. 10, the control light power is 12.9 mW, the control light position (i.e., distance between the signal light and the control light at the beam-condensing point in a direction perpendicular to the optical axis) is 35 μm, and the light absorption layer has a thickness equal to 500 μm.

The deflection angle also varies depending on the wavelength of the control light and the wavelength of the signal light. When the wavelength is short, the deflection angle becomes larger.

Comparative Example 1

Comparative Example 1 is similar to the example of the first embodiment, except that the collective lens 6 is not used and the signal light and the control light are respectively collimated and input into the thermal lens forming optical element 7 without being converged. According to the experimental data of Comparative Example 1, no deflection of the signal light was observed when the control light is emitted at a power level equal to 18 mW. Hence, the control light source was changed to Ti: sapphire laser to emit control light (980 nm) having a higher power. The solvent of the dye solution in the thermal lens forming optical element began boiling before deflection of the signal light was detected, confirming that creating deflection of the signal light would be difficult. Furthermore, the power of the control light was changed to a lower level where the boiling can almost start. Then, the layout and an inter-beam distance between the signal light and the control light were finely adjusted on a path leading to the thermal lens forming optical element. However, no optical path deflection of the signal light was observed. Furthermore, the layout and interbeam distance between the signal light and the control light in the light absorption layer of the thermal lens forming optical element was finely adjusted. However, no optical path deflection of the signal light was observed. In other words, if the control light is emitted as a collimated parallel beam so as to prevent the converged control light from diffusing and causing light absorption in the light absorption layer of the thermal lens forming optical element, a thermal lens having a sufficient size for deflecting an optical path of the signal light cannot be formed.

Second Embodiment

Figure 2:
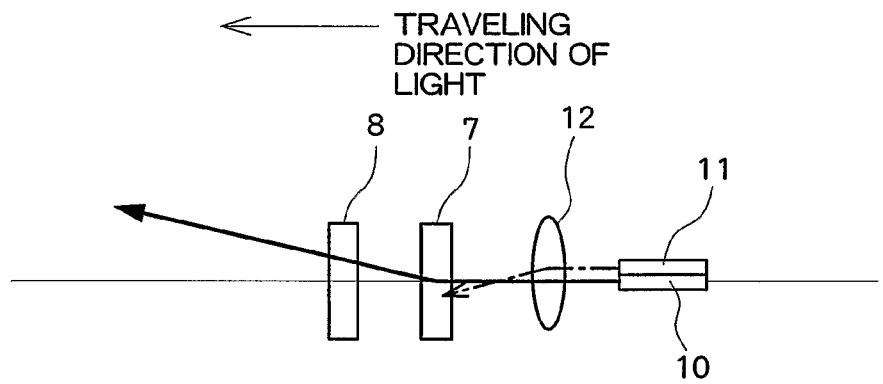
FIG. 2 illustrates an optical deflection apparatus according to a second embodiment of the present invention.

FIG. 2 illustrates an optical deflection apparatus according to a second embodiment of the present invention. In the second embodiment of the present invention, optical members similar to those described in the first embodiment are denoted by the same reference numerals.

The optical deflection apparatus shown in FIG. 2 includes a second signal light incidence terminal 10, a second control light incidence terminal 11, and a second image-forming lens 12 having a focal length equal to 8 mm. Furthermore, the optical deflection apparatus shown in FIG. 2 includes a thermal lens forming optical element 7 and a wavelength selective transmission filter 8 which are similar to those disclosed in FIG. 1. The signal light used in the second embodiment has a wavelength equal to 1550 nm, and the control light has a wavelength equal to 980 nm. However, as in the first embodiment, other wavelengths can be selected for the signal light and the control light. Furthermore, similar to the first embodiment, the deflection amount (deflection angle) changes if the power of the control light varies.

Figure 11:
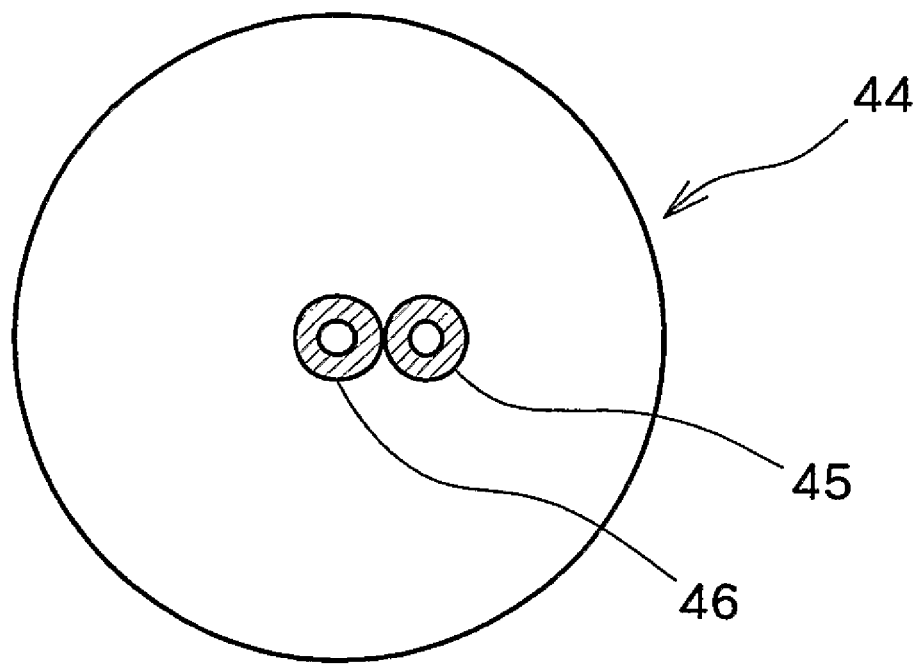
FIG. 11 illustrates a 2-wire optical fiber ferrule.

FIG. 11 illustrates a 2-wire optical fiber ferrule provided for the second signal light incidence terminal 10 and the second control light incidence terminal 11.

The 2-wire optical fiber ferrule shown in FIG. 11 includes a signal light emission fiber 46 and a control light emission fiber 45 which are formed by etching a clad layer of a single-mode quartz optical fiber having a core diameter equal to 9.5 μm with a hydrofluoric acid. To obtain a desired size, the portion to be etched is limited to only the front edge (several mm) of an optical fiber. The size "ω" of an optical fiber subjected to etching satisfies the following relationship.

$$\omega = \chi/m \quad \text{(Formula 1)}$$

where "χ" represents a distance between convergence (beam-condensing) points of the signal light and the control light converged (beam-condensed) in the light absorption layer in a direction perpendicular to the optical axis, and "m" represents an imaging magnification of the second collective lens 12. In the present embodiment, "m" is equal to 1. If "m" is small, the size of an etched optical fiber becomes larger. If "m" is large, the size of an etched optical fiber becomes smaller.

In the present embodiment, "m" is equal to 1 and "ω" is equal to 35 μm. As apparent from the first embodiment, if "ω" is large, the deflection angle becomes smaller. Therefore, an appropriate value of "ω" is within the range of 25 to 50 microns. If "ω" is equal to or less than 25 μm, a laser beam has insufficient transmissivity. In particular, a laser beam of 980 nm exhibits inferior transmissivity, on the order of 20% to 80%, when the laser beam passes through a 1 m long fiber.

An optical fiber for the control light and an optical fiber for the signal light were fixed in holes of the ferrules using appropriate adhesive. The size of each hole was 2ω+several μm. The front edge of the optical fiber was polished before use.

The optical fiber used in the present embodiment is a single-mode optical fiber having a core diameter equal to 9.5 μm. If the wavelength of a laser beam is changed, an optical fiber having a suitable core diameter is required. For example, the core diameter can be selected to 4.5 μm for the control light of 660 nm.

The light deflection amount (deflection angle) obtained in the present embodiment was comparable to that described in the first embodiment.

Third Embodiment

Figure 3:
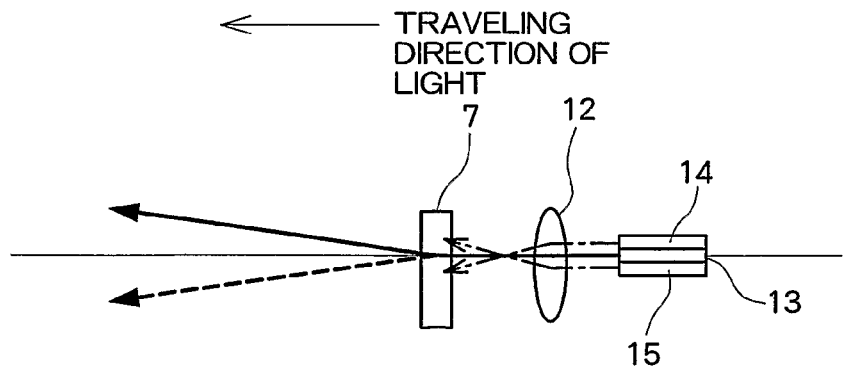
FIG. 3 illustrates an optical deflection apparatus according to a third embodiment of the present invention.

FIG. 3 illustrates an optical deflection apparatus according to a third embodiment of the present invention. In the third embodiment of the present invention, optical members similar to those described in the first and second embodiments are denoted by the same reference numerals. The third embodiment differs from the second embodiment in that one more control light is added so that the deflection angle can be doubled.

The optical deflection apparatus shown in FIG. 3 includes a third signal light incidence terminal 13, a third control light incidence terminal 14, and a fourth control light incidence terminal 15. Furthermore, the optical deflection apparatus shown in FIG. 3 includes a second collective lens 12 and a thermal lens forming optical element 7 which are similar to those disclosed in FIGS. 1 and 2. The signal light used in the third embodiment has a wavelength equal to 1550 nm, and the control light has a wavelength equal to 980 nm, although it is obvious that, as similar to the first and second embodiments, in the third embodiment, other wavelengths can be selected for the signal light and the control light. Furthermore, similar to the first and second embodiments, the deflection amount (deflection angle) changes if the power of the control light varies.

Figure 12A:
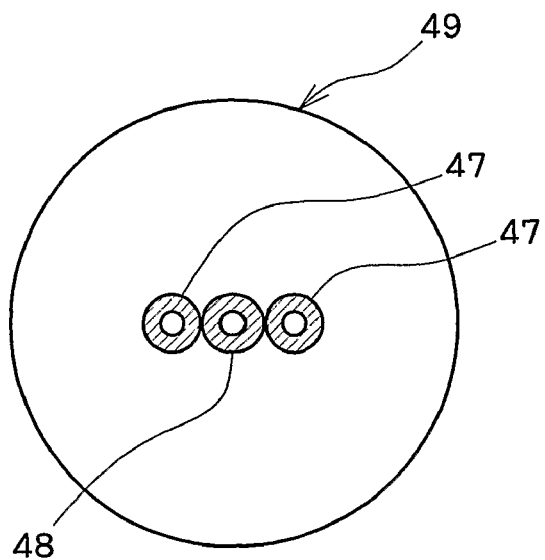
FIG. 12a illustrates a 3-wire optical fiber ferrule.

FIG. 12a illustrates a 3-wire optical fiber ferrule provided for the third signal light incidence terminal 13, the third control light incidence terminal 14, and the fourth control light incidence terminal 15.

Figure 12B:
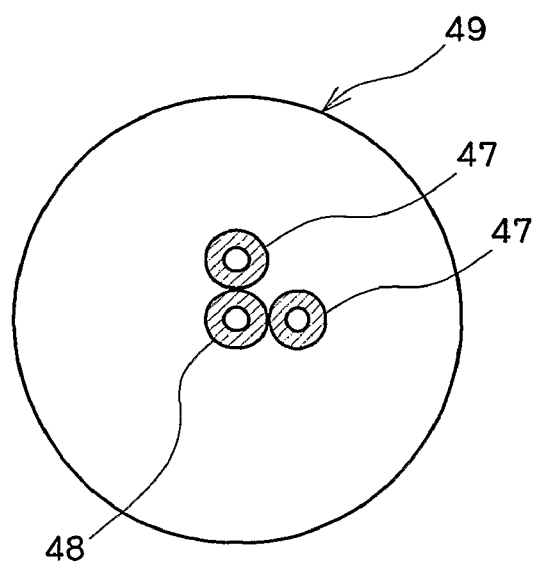
FIG. 12b illustrates another 3-wire optical fiber ferrule.

FIG. 12b illustrates a 3-wire optical fiber capable of realizing a two-dimensional deflection of light. The two-dimensional deflection can be realized by adjusting the power of the control light emitted from each control light emission fiber 47.

The 3-wire optical fiber ferrule shown in FIGS. 12a and 12b includes a signal light emission fiber 48 and two control light emission fibers 47 which are formed by etching a clad layer of a single-mode quartz optical fiber having a core diameter equal to 9.5 μm with a hydrofluoric acid. To obtain a desired size, the portion to be etched is limited to only the front edge (several mm) of an optical fiber. The size "ω" of an optical fiber subjected to etching satisfies the following relationship.

$$\omega = \chi/m \quad \text{(Formula 2)}$$

where "χ" represents a distance between convergence (beam-condensing) points of the signal light and the control light converged (beam-condensed) in the light absorption layer in a direction perpendicular to the optical axis, and "m" represents an imaging magnification of the second collective lens 12. In the present embodiment, "m" is equal to 1. If "m" is small, the size of an etched optical fiber becomes larger. If "m" is large, the size of an etched optical fiber becomes smaller.

In the present embodiment, "m" is equal to 1 and "ω" is equal to 35 μm. As apparent from the first embodiment, if "ω" is large, the deflection angle becomes smaller. Therefore, an appropriate value of "ω" is within the range of 25 to 50 microns. If "ω" is equal to or less than 25 μm, a laser beam has insufficient transmissivity. In particular, a laser beam of 980 nm has bad transmissivity in a level of 20% to 80% when the laser beam passes through a fiber of 1 m long.

According to the example shown in FIG. 12a, an optical fiber for the control light and an optical fiber for the signal light were fixed in holes of the ferrules using appropriate adhesive. The size of each hole was 3ω+several μm. The front edge of the optical fiber was polished before use. According to the example shown in FIG. 12b, an optical fiber for the control light and an optical fiber for the signal light were fixed in holes of the ferrules using appropriate adhesive. In this case, the size of each hole was $(1+\sqrt{2})\omega$+several μm. The front edge of the optical fiber was polished before use.

The optical fiber used in the present embodiment is a single-mode optical fiber having a core diameter equal to 9.5 μm. If the wavelength of a laser beam is changed, an optical fiber having a suitable core diameter is required. For example, the core diameter can be selected to 4.5 μm for the control light of 660 nm.

The light deflection amount (deflection angle) obtained in the present embodiment was comparable to those described in the first and second embodiments.

Fourth Embodiment

Figure 14:
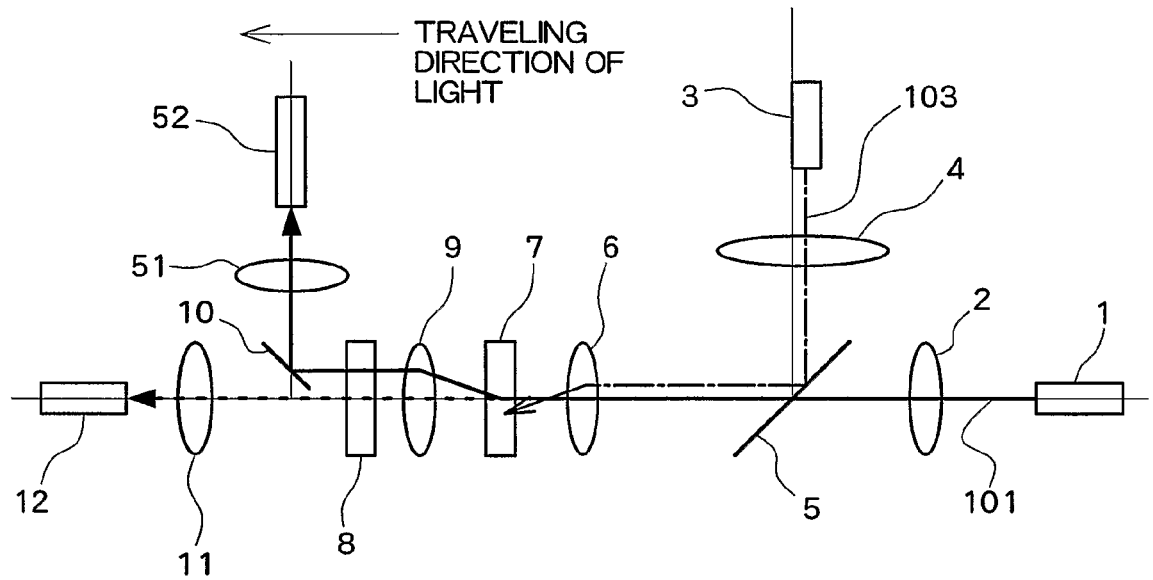
FIG. 14 illustrates a deflection-type optical path switching apparatus according to a fourth embodiment of the present invention.

FIG. 14 illustrates a deflection-type optical path switching apparatus according to a fourth embodiment of the present invention. The deflection-type optical path switching apparatus according to the fourth embodiment includes a signal light incidence terminal 1 serving as a signal light source, a first collimation lens 2 that can change signal light 101 into a parallel beam, a control light incidence terminal 3 serving as a control light source, a second collimation lens 4 that can change control light 103 into a parallel beam, an optical mixer 5 that can mix the signal light 101 and the control light 103, a collective lens 6 (i.e., beam-condensing unit) that can condense both the signal light 101 and the control light 103 to a light absorption layer of a thermal lens forming optical element 7, a third collimation lens 9 that can change the light having passed the thermal lens forming optical element 7 into a parallel beam, a wavelength selective transmission filter 8, a first branch mirror 10 that can branch non-deflection light and deflection light, a second collective lens 11 that can condense the non-deflection light to a first detector 12, the first detector 12 detecting the non-deflection light, a third collective lens 51 that can condense the deflection light to a second detector 52, and the second detector 52 detecting the deflection light.

Although not shown in this drawing, the signal light 101 incidence terminal 1 receives the signal light via an optical fiber. The signal light has a wavelength equal to 1550 nm. Any other signal light having a wavelength capable of reaching the light absorption layer of the thermal lens forming optical element 7 can be used. According to the present embodiment, instead of using an optical fiber, a laser beam source capable of emitting signal light can be directly attached to the signal light 101 incidence terminal 1.

Similar to the above-described first embodiment, in a deflection-type optical path switching method and an optical path switching apparatus according to the present invention, the light absorption layer in the thermal lens forming optical element can be appropriately selected according to the purpose of use. For example, material, signal light wavelength band, and control light wavelength band can be appropriately combined and determined according to the purpose of use.

Although not shown in this drawing, the control light incidence terminal 3 receives the control light via an optical fiber. The control light wavelength is similar to that described in the above-described first embodiment. According to the present embodiment, instead of using an optical fiber, a laser beam source capable of emitting control light can be directly attached to the control light incidence terminal 3.

Each of the first collimation lens 2, the second collimation lens 4, and the third collimation lens 9 is an aspherical lens having a focal length equal to 8 mm, although a more compact deflection-type optical path switching apparatus can be realized by using a lens having a focal length shorter than 8 mm. Use of aspherical lenses makes it possible to realize a compact and lightweight device.

The optical mixer 5, the collective lens 6, and the wavelength selective transmission filter 8 are similar to those disclosed in the above-described embodiment.

The collective lens 6 can cause both the signal light 101 and the control light 103 to converge on an incidence plane of the light absorption layer or its vicinity in the light traveling direction. When convergence (beam-condensation) of the signal light and the control light is caused at the same point in the vicinity of the incidence plane of a light absorption layer, the signal light expands with a doughnut shape, as shown in FIGS. 13a and 13b. If no control light is emitted, the signal light forms a round beam (refer to photograph 1a shown in FIG. 13a). On the other hand, FIG. 13b is photograph 1b obtained when both control light and signal light are emitted to the same point. It is presumed that the doughnut shape is clearly and largely formed on the incidence plane of a light absorption layer. In other words, the incidence plane of a light absorption layer is the place where a doughnut shape can be clearly and largely formed. In the present embodiment, the beam does not form a doughnut shape because convergence (beam-condensing) points of the signal light and the control light are spaced by a distance of 25 to 50 μm.

However, in a process of adjustment, both the signal light and the control light are emitted to the same point to form a doughnut shape. Then, the convergence (beam-condensing) points of the signal light and the control light are separated. If the distance between the convergence points of the signal light and the control light is less than 25 μm, the circular beams shown in FIGS. 13a and 13b cannot be obtained, and the light forms a crescent beam. If a crescent-shaped beam of beam-condensed signal light is input to an optical fiber, the beam will be of no practical use because the signal light will have insufficient incidence efficiency.

The thermal lens forming optical element 7 is configured as shown in FIG. 5. To simplify the description, only a light absorption layer is shown in the drawing. In FIG. 5, a thermal lens forming optical element 35 has a light absorption layer 34 including dye dissolved in a solvent and sealed by a glass container 36. The dye soluble in a solvent is similar to that described in the above-described first embodiment. Furthermore, the refractive index changes when the control light is absorbed in the light absorption layer of thermal lens forming optical element 7 in the same manner as in the above-described first embodiment.

FIGS. 4a and 4b illustrate exemplary deflection of signal light. The conditions for causing changes in the refractive index and the deflection angle are similar to those described in the first embodiment.

In the present embodiment, the signal light having a wavelength equal to 1550 nm is input to the signal light incidence terminal via a single-mode quartz optical fiber having a core diameter equal to 9.5 μm. The control light having a wavelength equal to 980 nm is input to the control light incidence terminal via a single-mode quartz optical fiber having a core diameter equal to 9.5 μm. The signal light and the control light are changed into parallel beams by the first collimation lens and the second collimation lens each having a focal length equal to 8 mm. Then, the light converged (beam-condensed) by the lens having a focal length equal to 8 mm enters into a thermal lens forming optical element. The thermal lens forming optical element includes a light absorption layer having a thickness equal to 500 μm. The transmissivity of the light absorption layer is 95% at a wavelength equal to 1550 nm and 0.2% at a wavelength equal to 980 nm.

Figure 18:
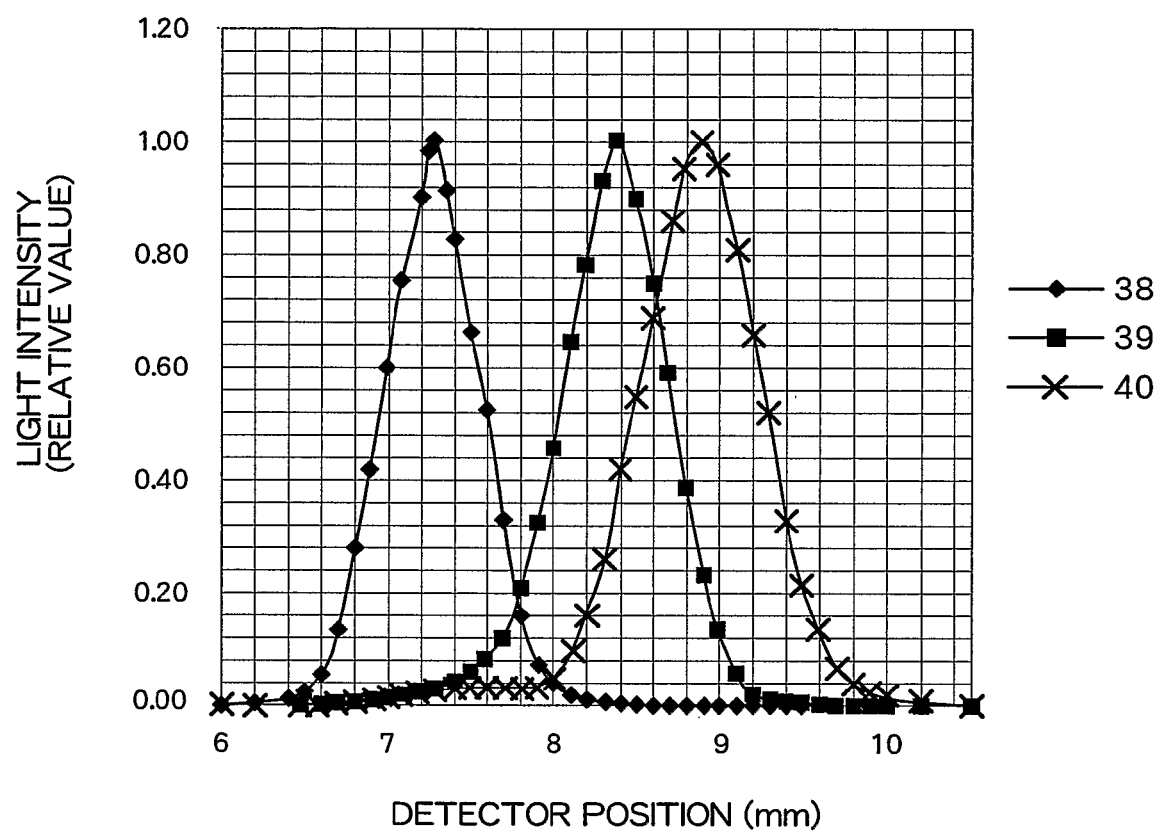
FIG. 18 is a graph illustrating a deflection light intensity distribution.

FIG. 18 illustrates a deflection light intensity distribution of signal light measured by shifting a slit-opening equipped light detector in a plane normal to an optical axis, at the position immediately before the branch mirror 10 shown in FIG. 14. In FIG. 18, line 38 (i.e., a solid line connectingpolished points) represents a light intensity distribution of non-deflection light measured when no control light is emitted, line 39 (i.e., a solid line connecting rectangular points) represents a light intensity distribution of deflection light measured when control light is emitted at a power level equal to 7.8 mW, and line 40 (i.e., a solid line connectingxpoints) represents a light intensity distribution of deflection light measured when control light is emitted at a power level equal to 12.9 mW. The fringes of the deflection light 39 (control light power=7.8 mW) and the non-deflection light 38 overlap each other and cannot be sufficiently separated from each other. On the other hand, the deflection light 40 (control light power=12.9 mW) can be completely separated from the non-deflection light 38. Therefore, the branch mirror 10 can separate the deflection light 40 from the non-deflection light 38 when the control light is emitted at a power level equal to 12.9 mW. In FIG. 18, the control light position (i.e., distance between the signal light and the control light at the beam-condensing point of the first collective lens 6 in a direction perpendicular to the optical axis) is 35 μm. The control light and the signal light cause convergence (beam-condensation) at a forward point spaced by approximately 30 μm from a light incidence plane of the light absorption layer. The light absorption layer has a thickness equal to 500 μm.

Figure 19:
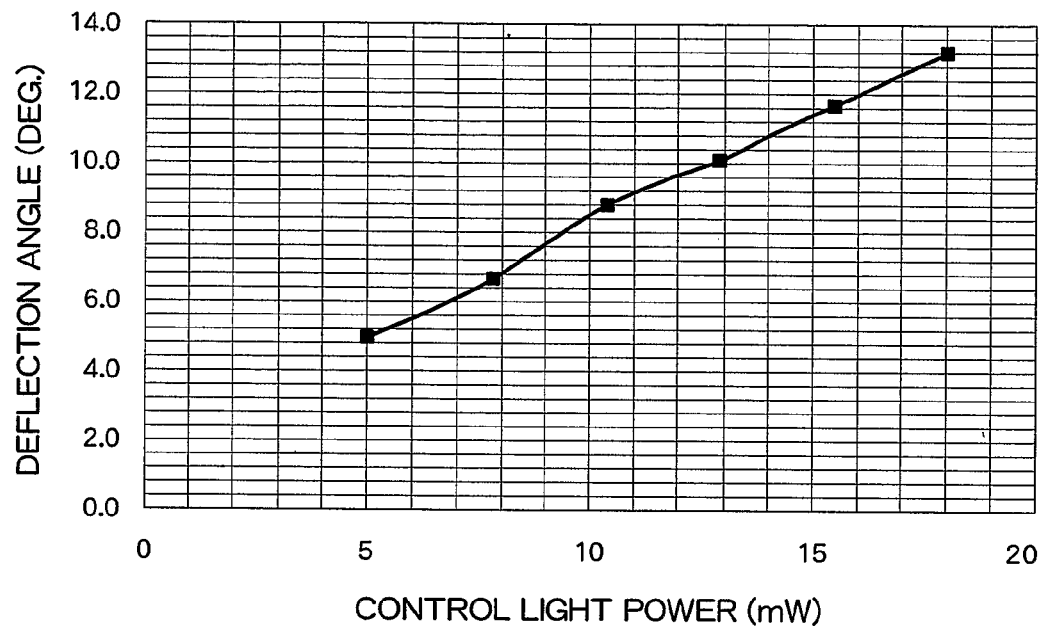
FIG. 19 is a graph illustrating a relationship between control light power and deflection angle.

When no control light is emitted, non-deflection light passes through the branch mirror 10 without being reflected and is converged (beam-condensed) to the light detector 12 by the collective lens 11 having a focal length equal to 8 mm. Thus, the light detector 12 can detect non-deflection light. FIG. 19 illustrates a relationship between control light power and deflection angle. When the control light power becomes larger, the deflection angle becomes larger. According to the example used for obtaining the data shown in FIG. 19, the control light position (i.e., distance between the signal light and the control light at the beam-condensing point of the first collective lens 6 in a direction perpendicular to the optical axis) is 35 μm. Both the control light and the signal light converges (beam-condenses) at a portion forward from the light incidence plane of the light absorption layer by an approximately 60 μm. When the control light is emitted with a sufficient power level (e.g., 12.9 mW or above according to the example shown in FIG. 19), the deflection light reflects at the branch mirror 10 shown in FIG. 1 and is converged (beam-condensed) to the light detector 52 by the collective lens 51 having a focal length equal to 8 mm. Thus, the light detector 52 can detect the deflection light. According to the present invention, each of the collective lens 11 and the collective lens 13 has a focal length equal to 8 mm. However, other collective lenses having different focal lengthlengths can be used. According to the present embodiment, a single-mode quartz optical fiber of 9.5 μm is provided for each of the light detectors 12 and 52. The optical fiber transmits converged (beam-condensed) signal light to each detector. Alternatively, the light detectors can be directly attached to corresponding collective lenses. Furthermore, instead of reflecting deflection light, the branch mirror 10 can reflect non-deflection light and transmit deflection light.

In general, the single-mode quartz optical fiber of 9.5 μm has a numerical aperture (hereinafter, referred to as NA) of 0.1. The maximum incidence angle θc at which the light can propagate in an optical fiber having an NA value equal to 0.1 is approximately 5.7 degrees.

$$\theta c = \mathrm{Sin}^{-1}(0.1) \approx 5.7 \text{ degrees} \qquad \text{(Formula 3)}$$

In the example shown in FIG. 14, the third collimation lens 9, the collective lens 11, and the collective lens 51 have the same focal length equal to 8 mm. The deflection angle is equal to an angle formed between an optical axis of deflection light entering an optical fiber and an optical axis of non-deflection light, when the light is not branched by the branch mirror 10. For example, the deflection angle is approximately 6.7 degrees at a control light power level equal to 7.8 mW, approximately 10.1 degrees at a control light power level equal to 12.9 mW, and approximately 13.2 degrees at a control light power level equal to 18 mW. If the deflection light and the non-deflection light are not sufficiently branched by the branch mirror 10, non-deflection light enters into the deflection light detecting optical fiber and deflection light enters into the non-deflection light detecting optical fiber, about the center corresponding to this angle. The signal light is also input using a single-mode quartz optical fiber having a core diameter equal to 9.5 μm. Therefore, the numerical aperture (NA) of the optical fiber is equal to 0.1. The convergence (beam-condensing) angle of the signal light is approximately 5.7 degrees. Therefore, signal light can enter the optical fibers of the first light detector 12 and the second light detector 52 when the control light power level is 7.8 mW, although the incidence efficiency of the signal light may deteriorate. However, almost no signal light is able enter the optical fibers of the first detector 12 and the second detector 52 when the control light power is 12.9 mW, and no signal light whatsoever can enter the optical fibers when the control light power is 18 mW. Therefore, even when separation of non-deflection light and deflection light at the branch mirror 10 is insufficient, no deflection light enters the optical fiber of the first light detector 12 and no non-deflection light enters the optical fiber of the second light detector 52 if the control light power is large and the deflection angle is large. The optical path switching can be realized with a large extinction ratio.

Figure 20:
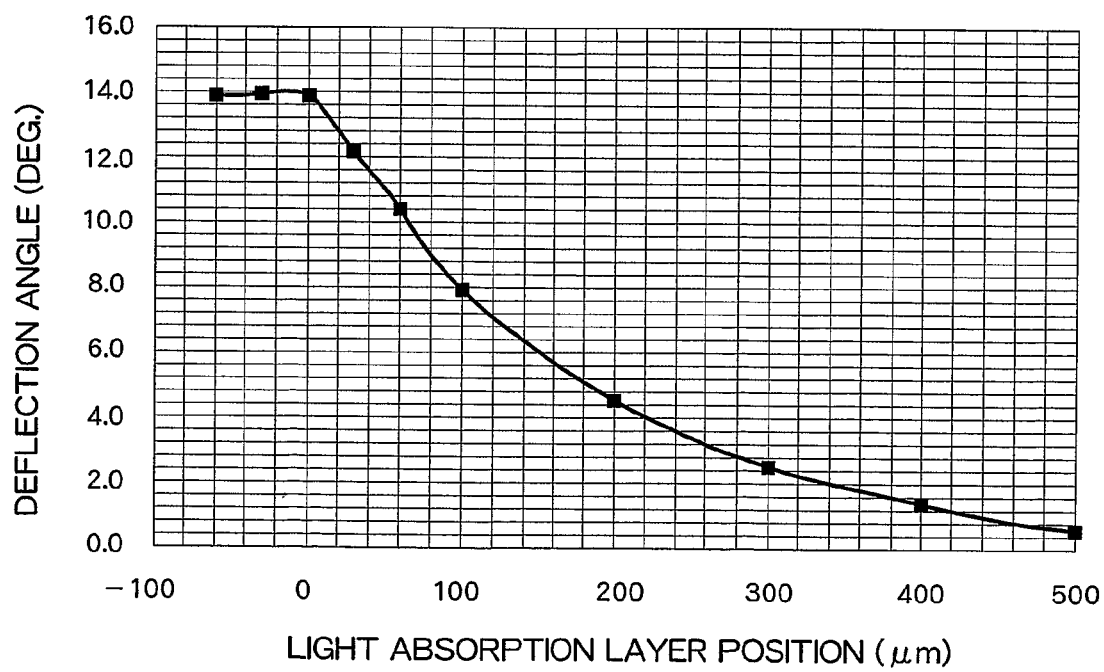
FIG. 20 is a graph illustrating a relationship between light absorption layer position and deflection angle.

FIG. 20 illustrates a relationship between "light absorption layer position" and deflection angle. The "light absorption layer position" represents the incidence position of the convergence (beam-condensing) point of the signal light and the control light entering the light absorption layer 34 of the thermal lens forming optical element 7 shown in FIG. 4b. In FIG. 20, an abscissa is the light absorption layer position representing the incidence position of the light entering the light absorption layer 34 of the thermal lens forming optical element 7 (i.e., position of the control light and the signal light relative to the convergence (beam-condensing) point). The 0-point corresponds to the condition shown in FIG. 4b where the light incidence plane position of the light absorption layer 34 in the thermal lens forming optical element 7 agrees with the convergence (beam-condensing) point of the control light and the signal light. In FIG. 20, a minus direction represents a light traveling direction. At a plus position, convergence (beam-condensation) of the signal light and the control light is caused in the light absorption layer 34 of the thermal lens forming optical element 7. The ordinate represents the deflection angle. The example used for obtaining the data shown in FIG. 20 has a control light power equal to or near 12.9 mW. The control light position (i.e., distance between the signal light and the control light at the beam-condensing point in a direction perpendicular to the optical axis) is 35 μm. The light absorption layer has a thickness equal to 500 μm. Under the conditions shown in FIG. 20, the deflection angle is large when the light absorption layer position is approximately 40 μm or less. No deflection light enters the optical fiber of the first light detector 12, and no non-deflection light enters the optical fiber of the second light detector 52. As apparent from FIG. 19, if the control light power is increased, the limit with respect to the light absorption layer position for obtaining a sufficient deflection angle can be changed to a larger value, e.g., approximately 100 μm.

Figure 21:
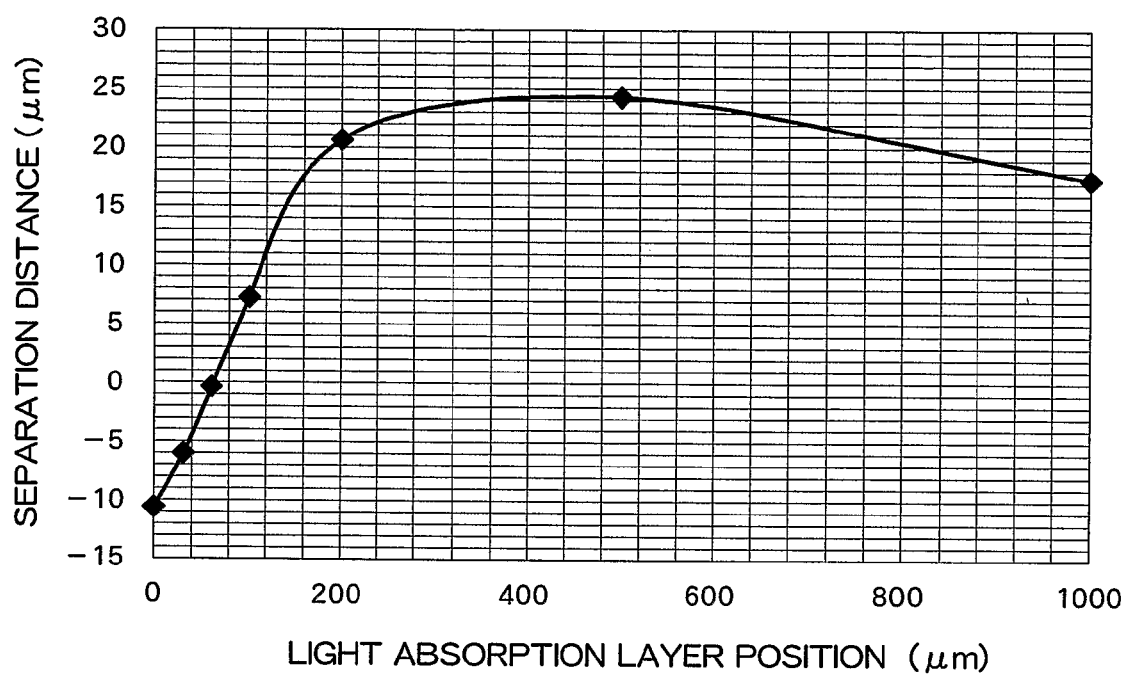
FIG. 21 is a graph illustrating a separation distance between non-deflection light and deflection light.

Furthermore, instead of separating non-deflection light and deflection light at the branch mirror 10, it is possible to separate the non-deflection light and the deflection light at the position of the light detector. FIG. 21 shows exemplary measurement data with respect to a relationship between "light absorption layer position" and a separation distance between the non-deflection light and the deflection light. The "light absorption layer position" represents the incidence position of the convergence (beam-condensing) point of the signal light and the control light entering the light absorption layer 34 of the thermal lens forming optical element shown in FIG. 4b. When the light absorption layer position is approximately 60 μm, the separation distance is almost 0. However, when the light absorption layer position increases, the distance becomes larger. In FIG. 21, the origin (i.e., 0-point) is an incidence point of signal light. The separation distance becomes a positive value when it corresponds to a direction of deflection. When the separation distance is large, even when separation of non-deflection light and deflection light at the branch mirror 10 in FIG. 14 is insufficient, no deflection light enters into the optical fiber of the first light detector 12 and no non-deflection light enters into the optical fiber of the second light detector 52. The measurement data of FIG. 21 were obtained by shifting a slit-opening equipped detector at the position corresponding to the first detector 12. According to the example used for obtaining the data shown in FIG. 21, the control light power is 15.4 mW, the light absorption layer has a thickness equal to 1000 µm, and the control light position (i.e., distance between the signal light and the control light at the beam-condensing point of the first collective lens 6 in a direction perpendicular to the optical axis) is 25 µm.

As described above, according to the present embodiment, detection of non-deflection light and deflection light can be separately performed by respective light detectors based on use of the branch mirror 10, input of non-detected light with an incidence angle exceeding a maximum value that the optical fiber can propagate, and separation at the light detector position. Thus, a highly accurate optical path switching can be realized.

FIG. 22 illustrates exemplary optical path switching measurement data. In FIG. 22, all measurement data corresponding to 0.1 µW or less are indicated as a representative value because a measurement device was not reliable in measurement values at 0.1 µW or less. Similarly, extinction ratio calculation data corresponding to 0.1 µW or less are indicated as a representative value. The extinction ratio obtained for each of the non-deflection light and the deflection light was greater than 40 dB, except for a sample No. 7.

The deflection angle varies depending on the wavelength of the control light and the wavelength of the signal light. When the wavelength is short, the deflection angle is large.

Comparative Example 2

Comparative Example 2 is similar to the fourth embodiment except that the collective lens 6 is not used and the signal light and the control light are respectively collimated and input into the thermal lens forming optical element 7 without being converged and the third collimation lens 8 is not used. According to the experimental data obtained from Comparative Example 2, no deflection of the signal light was observed when the control light is emitted at a power level equal to 18 mW. Hence, the control light source was changed to Ti: sapphire laser to emit control light (980 nm) having a higher power. As the solvent of the dye solution in the thermal lens forming optical element began boiling before deflection of the signal light was detected, it was confirmed that creating deflection of the signal light would be difficult. The power of the control light was then reduced to a lower level below but near the boiling point, and the layout and an inter-beam distance between the signal light and the control light were finely adjusted on a path leading to the thermal lens forming optical element. However, no optical path deflection of the signal light was observed. Furthermore, the layout and an inter-beam distance between the signal light and the control light in the light absorption layer of the thermal lens forming optical element was finely adjusted. However, no optical path deflection of the signal light was observed. Namely, if the control light is emitted as a collimated parallel beam so as to prevent the converged control light from diffusing and causing light absorption in the light absorption layer of the thermal lens forming optical element, a thermal lens having a sufficient size for deflecting an optical path of the signal light cannot be formed.

Fifth Embodiment

Figure 15:
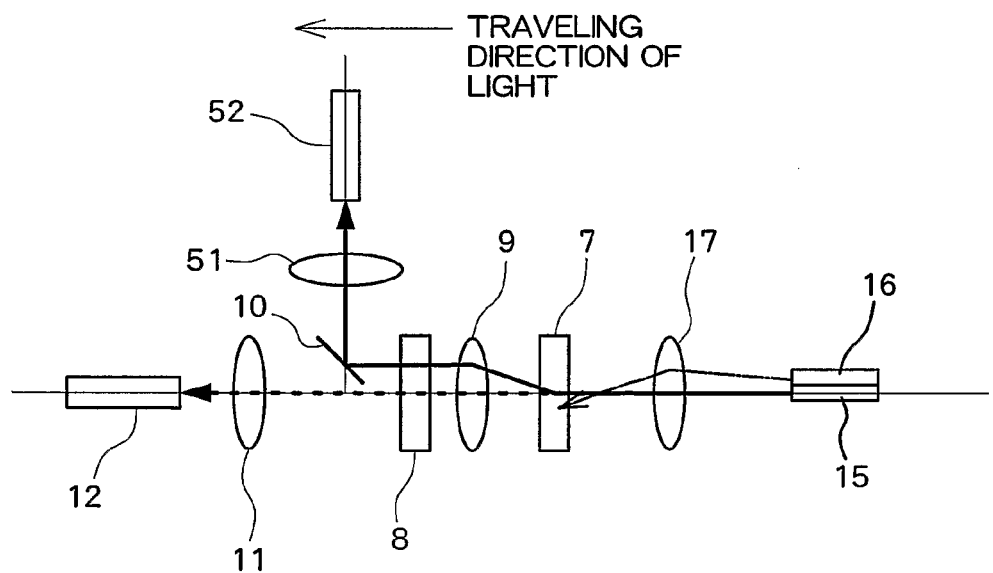
FIG. 15 illustrates a deflection-type optical path switching apparatus according to a fifth embodiment of the present invention.

FIG. 15 illustrates a deflection-type optical path switching apparatus according to a fifth embodiment of the present invention. In the fifth embodiment of the present invention, optical members similar to those described in the fourth embodiment are denoted by the same reference numerals.

The deflection-type optical path switching apparatus disclosed in FIG. 15 includes a second signal light incidence terminal 15, a second control light incidence terminal 16, and a fourth image-forming lens 17 having a focal length equal to 8 mm. Other optical members shown in FIG. 15 are similar to those disclosed in FIG. 14. Furthermore, the signal light used in the present embodiment has a wavelength equal to 1550 nm, and the control light has a wavelength equal to 980 nm. However, it is obvious that, as in the fourth embodiment, other wavelengths can be selected for the signal light and the control light. Furthermore, also similar to the fourth embodiment, the deflection amount (deflection angle) varies in conjunction with the power of the control light.

FIG. 11 illustrates a 2-wire optical fiber ferrule provided for the second signal light incidence terminal 15 and the second control light incidence terminal 16.

The 2-wire optical fiber ferrule shown in FIG. 11 includes a signal light emission fiber 46 and a control light emission fiber 45 which are formed by etching a clad layer of a single-mode quartz optical fiber having a core diameter equal to 9.5 µm with a hydrofluoric acid. To obtain a desired size, the portion to be etched is limited to only a front edge (several mm) of an optical fiber. The size "ω" of an optical fiber subjected to etching satisfies the following relationship.

$$\omega = \chi/m \quad \text{(Formula 4)}$$

where "χ" represents a distance between convergence (beam-condensing) points of the signal light and the control light converged (beam-condensed) in the light absorption layer in a direction perpendicular to the optical axis, and "m" represents an imaging magnification of the fourth collective lens 17. In the present embodiment, "m" is equal to 1. If "m" is small, the size of an etched optical fiber becomes larger. If "m" is large, the size of an etched optical fiber becomes smaller.

In the present embodiment, "m" is equal to 1 and "ω" is equal to 35 µm. As apparent from the fourth embodiment, if "ω" is large, the deflection angle becomes smaller. Therefore, an appropriate value of "ω" is within the range of 25 to 50 microns. If "ω" is equal to or less than 25 µm, a laser beam has insufficient transmissivity. In particular, the transmissivity of a 980 nm laser beam is inferior, on the order of 20% to 80%, when the laser beam passes through a 1 m long fiber.

An optical fiber for the control light and an optical fiber for the signal light were fixed in holes of the ferrules using appropriate adhesive. The size of each hole was 2ω+several µm. The front edge of the optical fiber was polished before use.

The optical fiber used in the present embodiment is a single-mode optical fiber having a core diameter equal to 9.5 µm. If the wavelength of a laser beam is changed, an optical fiber having a suitable core diameter is required. For example, the core diameter can be selected to 4.5 µm for the control light of 660 nm.

The optical path switching data obtained in the present embodiment were comparable to those described in the fourth embodiment.

Sixth Embodiment

Figure 16:
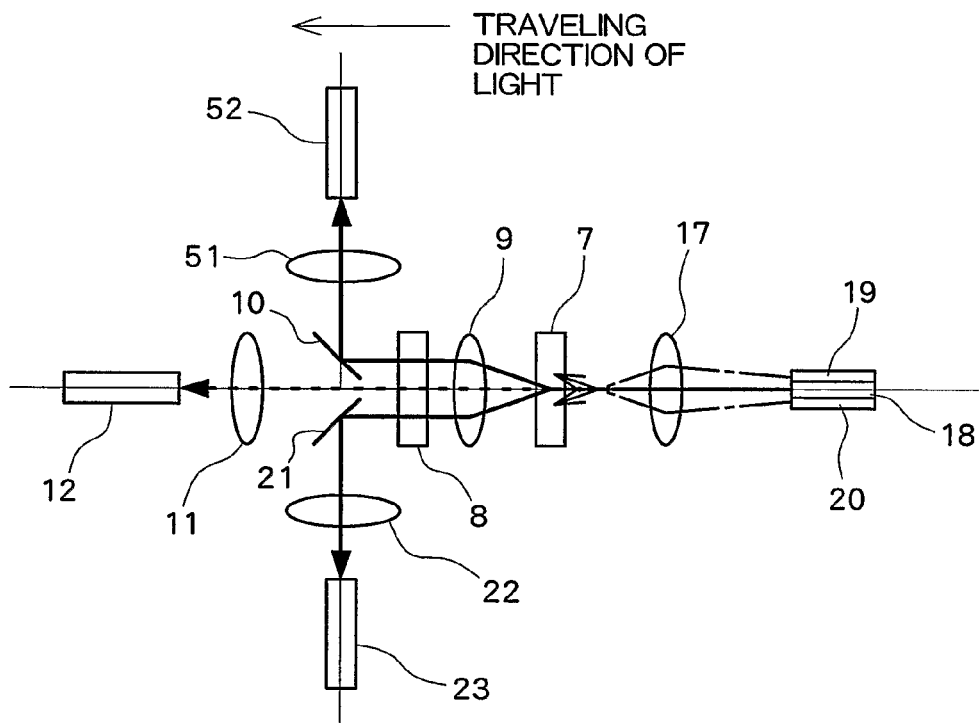
FIG. 16 illustrates a deflection-type optical path switching apparatus according to a sixth embodiment of the present invention.

FIG. 16 illustrates a deflection-type optical path switching apparatus according to a sixth embodiment of the present invention. In the sixth embodiment of the present invention, optical members similar to those described in the fourth and fifth embodiments are denoted by the same reference numerals. The configuration of the sixth embodiment differs from that of the fifth embodiment in that one more control light is added to provide a total of three switchable optical paths. The deflection-type optical path switching apparatus shown in FIG. 16 includes a third signal light incidence terminal 18, a third control light incidence terminal 19, a fourth control light incidence terminal 20, a second branch mirror 21, a fifth collective lens, and a third detector 23. The rest of the arrangement of the deflection-type optical path switching apparatus shown in FIG. 16 is similar to those disclosed in FIGS. 14 and 15. The signal light used in the sixth embodiment has a wavelength of 1550 nm, and the control light has a wavelength of 980 nm. However, it is obvious that, similar to the fourth and fifth embodiments, in the sixth embodiment, other wavelengths can be selected for the signal light and the control light. Furthermore, also similar to the fourth and fifth embodiments, the deflection amount (deflection angle) varies in relation to the power of the control light.

FIG. 12a illustrates a 3-wire optical fiber ferrule provided for the third signal light incidence terminal 18, the third control light incidence terminal 19, and the fourth control light incidence terminal 20.

FIG. 12b illustrates a 3-wire optical fiber capable of realizing a two-dimensional optical path switching operation. Although not shown in this drawing, an embodiment using the 3-wire optical fiber shown in FIG. 12b can be realized by shifting the second branch mirror shown in FIG. 16 so as to reflect the light in a direction perpendicular to a paper surface.

The 3-wire optical fiber ferrule shown in FIGS. 12a and 12b includes a signal light emission fiber 48 and two control light emission fibers 47 which are formed by etching a clad layer of a single-mode quartz optical fiber having a core diameter equal to 9.5 μm with a hydrofluoric acid. To obtain a desired size, the portion to be etched is limited to only a front edge (several mm) of an optical fiber. The size "ω" of an optical fiber subjected to etching satisfies the following relationship.

$$\omega = \chi/m \quad \text{(Formula 5)}$$

where "χ" represents a distance between convergence (beam-condensing) points of the signal light and the control light converged (beam-condensed) in the light absorption layer in a direction perpendicular to the optical axis, and "m" represents an imaging magnification of the second collective lens 12. In the present embodiment, "m" is equal to 1. If "m" decreases, the size of an etched optical fiber becomes larger, while, if "m" increases, the size of an etched optical fiber becomes smaller.

In the present embodiment, "m" is equal to 1 and "ω" is equal to 35 μm. As apparent from the fourth embodiment, if "ω" is large, the deflection angle becomes smaller. Therefore, an appropriate value of "ω" is within the range of 25 to 50 microns. If "ω" is equal to or less than 25 μm, a laser beam has insufficient transmissivity. In particular, the transmissivity of a 980 nm laser beam is inferior, on the order of 20% to 80%, when the laser beam passes through a 1 m long fiber.

According to the example shown in FIG. 12a, an optical fiber for the control light and an optical fiber for the signal light were fixed in holes of the ferrules using appropriate adhesive. The size of each hole was 3ω+several μm. The front edge of the optical fiber was polished before use. According to the example shown in FIG. 12b, an optical fiber for the control light and an optical fiber for the signal light were fixed in holes of the ferrules using appropriate adhesive. In this case, the size of each hole was $(1+\sqrt{2})\omega$+several μm. The front edge of the optical fiber was polished before use.

The optical fiber used in the present embodiment is a single-mode optical fiber having a core diameter equal to 9.5 μm. If the wavelength of a laser beam is changed, an optical fiber having a suitable core diameter is required. For example, the core diameter can be selected to 4.5 μm for the control light of 660 nm.

The optical path switching data obtained in the present embodiment were comparable to those described in the fourth and fifth embodiments.

Seventh Embodiment

Figure 17:
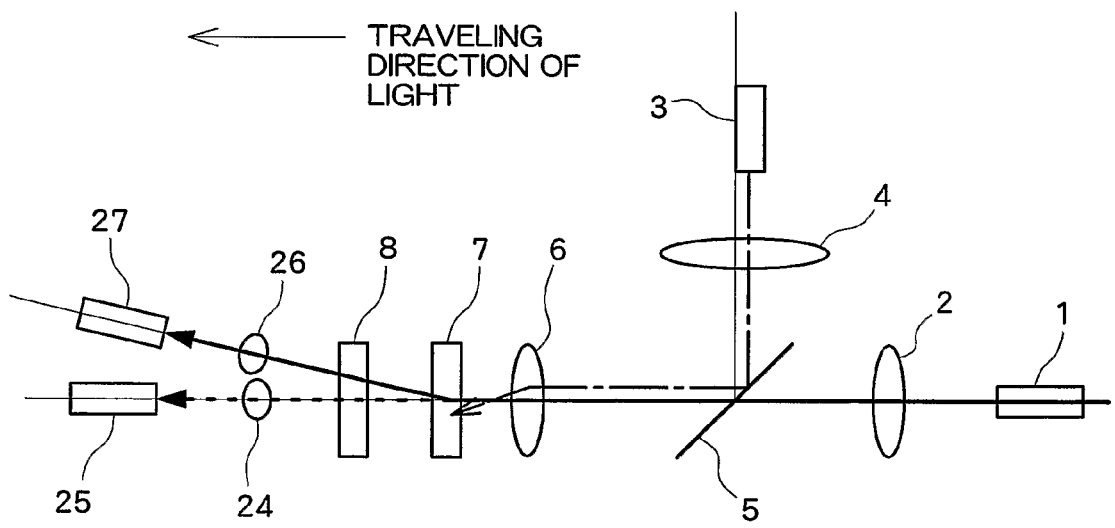
FIG. 17 illustrates a deflection-type optical path switching apparatus according to a seventh embodiment of the present invention.

FIG. 17 illustrates an optical path switching apparatus according to a seventh embodiment of the present invention. In the seventh embodiment of the present invention, optical members similar to those described in the fourth, fifth, and sixth embodiments are denoted by the same reference numerals. The seventh embodiment differs from the fourth embodiment in that different detection units are used and that no branch mirror is used. The non-deflection light and the deflection light traveling in different directions can be converged (beam-condensed) by two lenses and detected by two light detectors. In FIG. 17, the non-deflection light is converged (beam-condensed) by a sixth collective lens 24 having a focal length equal to 8 mm and detected by a fourth detector 25. Furthermore, the deflection light is converged (beam-condensed) by a seventh collective lens 26 having a focal length equal to 8 mm and detected by a fifth detector 27.

According to the present invention, each of the collective lens 24 and the collective lens 26 has a focal length equal to 8 mm. However, other collective lenses having different focal lengthlengths can be used. According to the present embodiment, a single-mode quartz optical fiber of 9.5 μm is provided for each of the light detectors 25 and 27. The optical fiber transmits converged (beam-condensed) signal light to each detector. Alternatively, the light detectors can be directly attached to corresponding collective lenses.

Although here the selected signal light has a wavelength equal to 1550 nm, and the control light has a wavelength equal to 980 nm, it is obvious that, as in the fourth, fifth, and sixth embodiments, other wavelengths can be selected for the signal light and the control light.

The optical path switching data obtained in the present embodiment are comparable to those in the fourth, fifth, and sixth embodiments.

Eighth Embodiment

Figure 23:
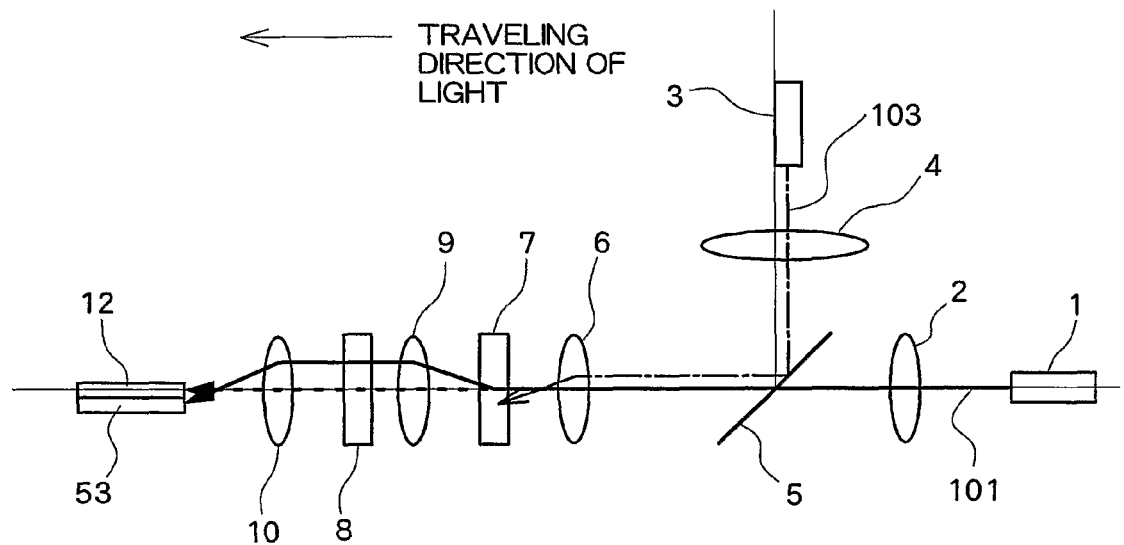
FIG. 23 illustrates an optical path switching apparatus according to an eighth embodiment of the present invention.

FIG. 23 illustrates an optical path switching apparatus according to an eighth embodiment of the present invention. The optical path switching apparatus according to the eighth embodiment of the present invention includes a signal light incidence terminal 1 serving as a signal light source, a first collimation lens 2 that can change signal light 101 to a parallel beam, a control light incidence terminal 3 serving as a control light source, a second collimation lens 4 that can change control light 103 to a parallel beam, an optical mixer 5 that can mix the signal light 101 and the control light 103, a collective lens 6 (i.e., beam-condensing unit) that can condense both the signal light 101 and the control light 103 to a light absorption layer of a thermal lens forming optical element 7, a thermal lens forming optical element 7, a third collimation lens 9 that can change the light having passed the thermal lens forming optical element 7 to a parallel beam, a wavelength selective transmission filter 8, and a second collective lens 10 that can condense non-deflection light to a first detector 12 and condense deflection light to a second detector 53.

Although not shown in this drawing, the signal light incidence terminal 1 receives the signal light 101 via an optical fiber. The signal light has a wavelength equal to 1550 nm. Any other signal light having a wavelength capable of reaching the light absorption layer of the thermal lens forming optical element 7 can be used. According to the present embodiment, instead of using an optical fiber, a laser beam source capable of emitting signal light 101 can be directly attached to the signal light incidence terminal 1.

Similar to the above-described first embodiment, in a deflection-type optical path switching method and an optical path switching apparatus according to the present invention, the light absorption layer in the thermal lens forming optical element can be appropriately selected according to the intended use. For example, material, signal light wavelength band, and control light wavelength band can be appropriately combined and determined in consideration of the intended use.

Although not shown in this drawing, the control light incidence terminal 3 receives the control light via an optical fiber. The control light wavelength is similar to that described in the above-described first embodiment. According to the present embodiment, instead of using an optical fiber, a laser beam source capable of emitting control light can be directly attached to the control light incidence terminal 1.

Each of the first collimation lens 2, the second collimation lens 4, and the third collimation lens 9 is an aspherical lens having a focal length equal to 8 mm. It is obvious, however, that a more compact deflection-type optical path switching apparatus can be realized by using a lens having a focal length shorter than 8 mm. Using aspherical lenses can further help realize a compact and lightweight device.

The optical mixer 5 and the collective lens 6 are similar to those described above.

In the present embodiment, the signal light of 1550 nm is input to the signal light incidence terminal via a single-mode quartz optical fiber having a core diameter equal to 9.5 μm. The control light of 980 nm is input to the control light incidence terminal via a single-mode quartz optical fiber having a core diameter equal to 9.5 μm. The first collimation lens 2 and the second collimation lens 4, respectively having a focal length equal to 8 mm, redirect the signal light and the control light to form parallel beams, which are then converged (beam-condensed) by the collective lens 6 having a focal length equal to 8 mm and input to the thermal lens forming optical element 7. The thermal lens forming optical element 7 includes a light absorption layer having a thickness equal to 500 μm. The light absorption layer has a dye concentration in the range of 0.1 to 0.15%. The transmissivity of the light absorption layer is 95 to 80% at a wavelength equal to 1550 nm and 0.8 to 0.3% at a wavelength equal to 980 nm.

The collective lens 6 can cause both the signal light and the control light to converge on an incidence plane of the light absorption layer or its vicinity in the light traveling direction. When the signal light and the control light are made to converge at the same point in the vicinity of the incidence plane of a light absorption layer, the signal light expands with a doughnut shape, as shown in FIGS. 13a and 13b, while, if no control light is emitted, signal light is a round beam (refer to photograph 1a shown in FIG. 13a). On the other hand, FIG. 13b is photograph 1b obtained when both control light and signal light are emitted to the same point. It is presumed that the doughnut shape is clearly and largely formed on the incidence plane of a light absorption layer. In other words, the incidence plane of a light absorption layer is the place where a doughnut shape can be clearly and largely formed. In the present embodiment, no doughnut shape is formed because convergence (beam-condensing) points of the signal light and the control light are spaced by a distance of 25 to 50 μm. However, in a process of adjustment, both the signal light and the control light are emitted to the same point to form a doughnut shape. Then, the convergence (beam-condensing) points of the signal light and the control light are separated. If the distance between the convergence points of the signal light and the control light is less than 25 μm, the circular beams shown in FIGS. 13a and 13b cannot be obtained, and the light beam forms a crescent shape. If the signal light is a crescent beam and the beam-condensed signal light is input to an optical fiber, the incidence efficiency will decrease to the point where the configuration is not of practical use.

The thermal lens forming optical element 7 has an arrangement shown in FIG. 5. To simplify the description, only a light absorption layer is shown in the drawing. In FIG. 5, a thermal lens forming optical element 35 has a light absorption layer 34 including dye dissolved in a solvent and sealed by a glass container 36. The dye soluble in a solvent is similar to that described in the above-described first embodiment. Furthermore, the refractive index changes when the control light is absorbed in the light absorption layer of thermal lens forming optical element 7 in the same manner as in the first embodiment described above.

Figure 26A:
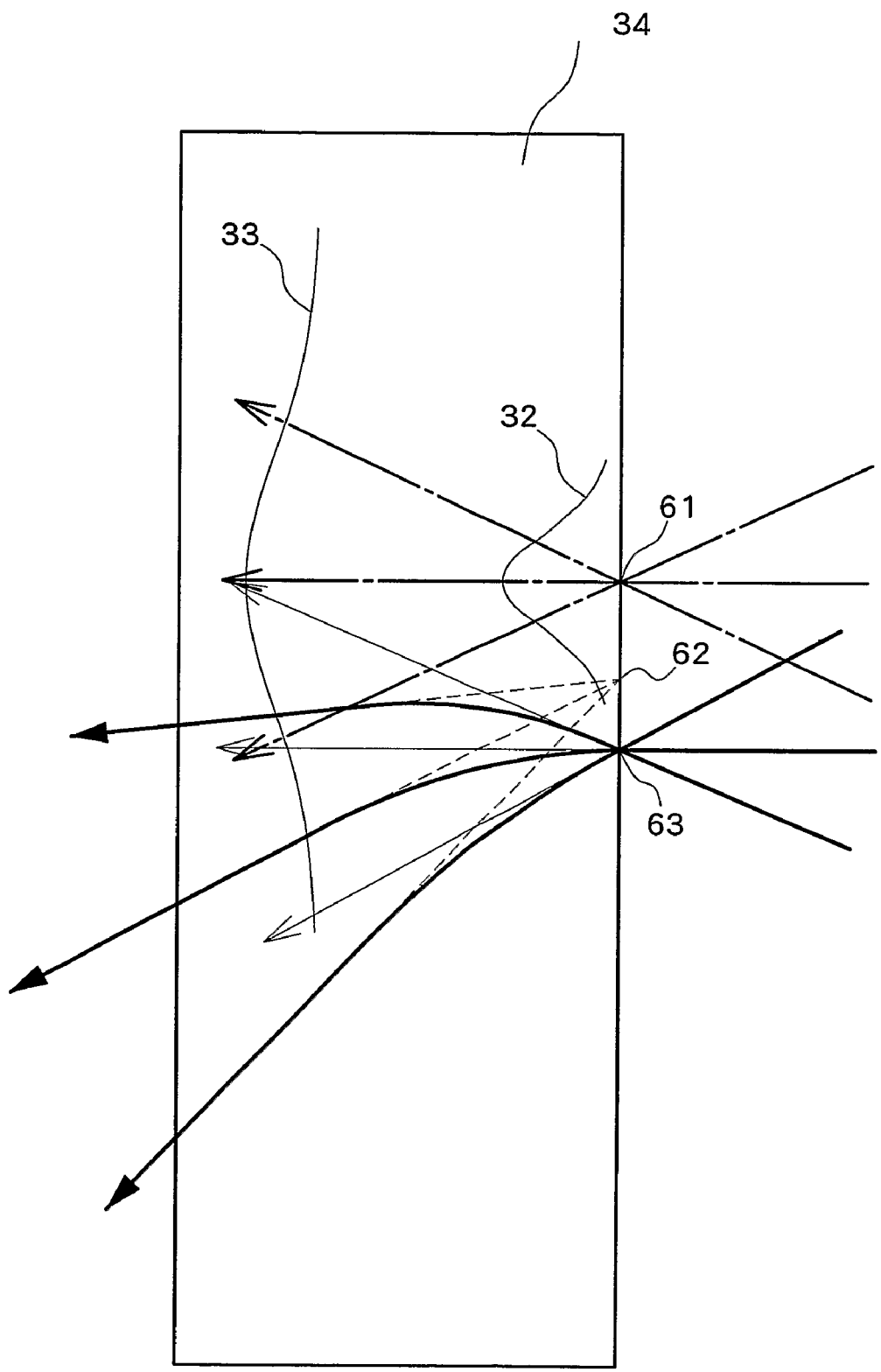
FIG. 26a illustrates deflection of signal light.
Figure 26B:
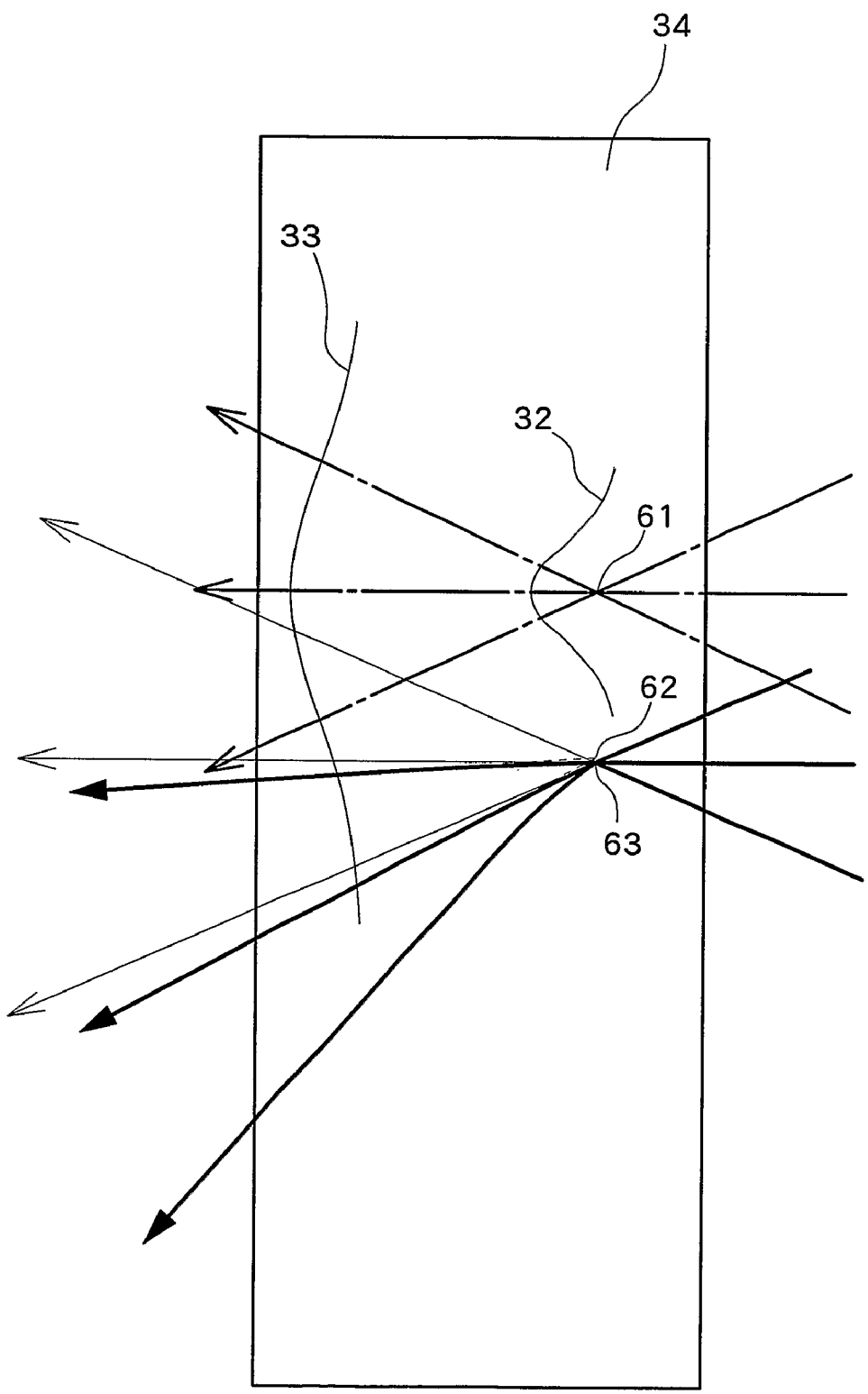
FIG. 26b illustrates deflection of signal light.
Figure 26C:
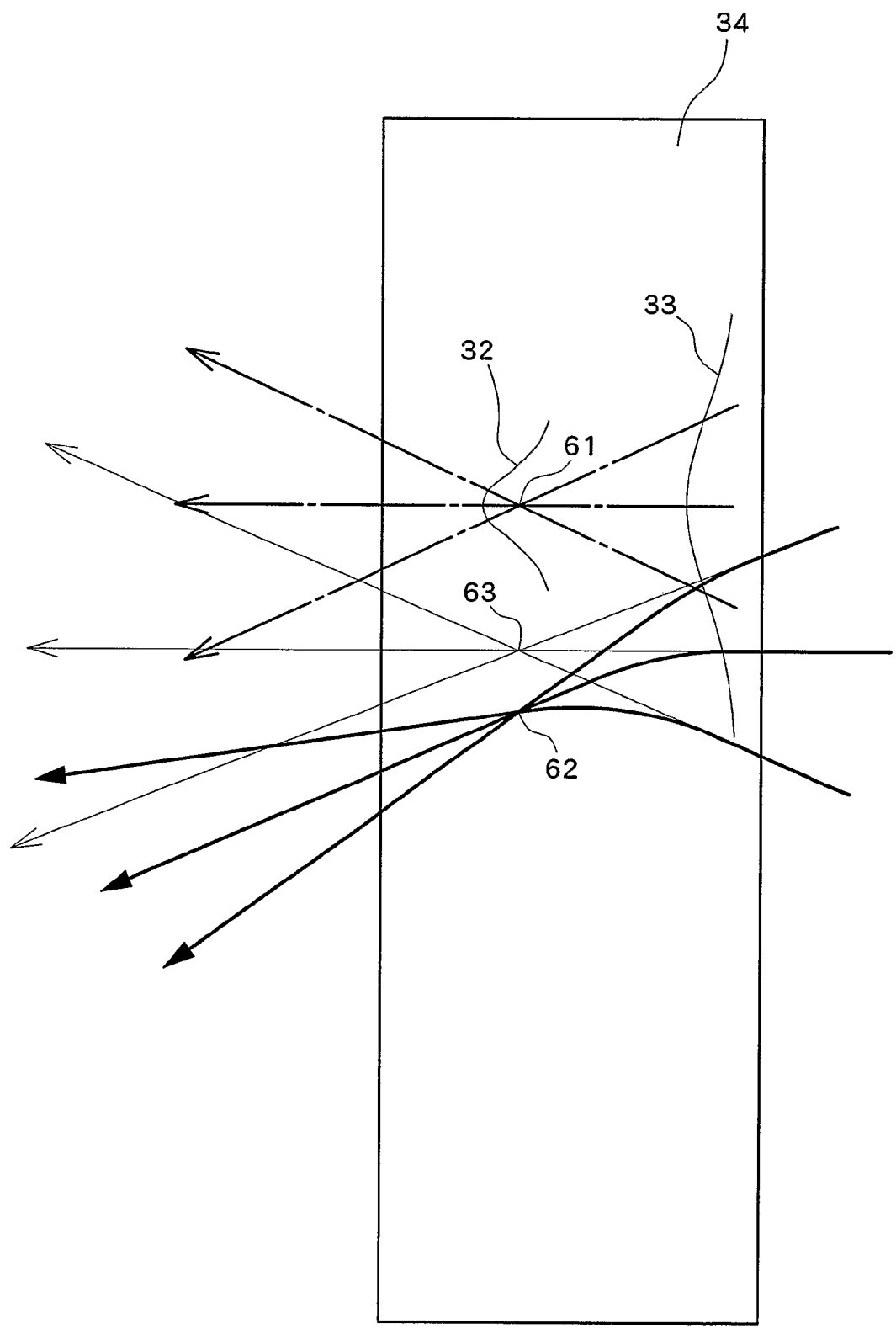
FIG. 26c illustrates deflection of signal light.

FIGS. 26a, 26b, and 26c illustrate exemplary deflection of signal light. To simplify the description, FIGS. 26a, 26b, and 26c disregard light refractions caused by the difference in refractive index between the light absorption layer and its surrounding substance. FIGS. 26a, 26b, and 26c show a control light convergence (beam-condensing) point 61 of the, a signal light convergence (beam-condensing) point 63, and a apparent signal light convergence (beam-condensing) point 62. In the light absorption layer 34 of the thermal lens forming optical element shown in FIGS. 26a, 26b, and 26c, line 32 represents a light intensity distribution of the control light in the vicinity of the convergence (beam-condensing) point, and line 33 represents a light intensity distribution of the control light far from the convergence (beam-condensing) point. FIG. 26a illustrates exemplary optical paths of the control light and the signal light which cause convergence (beam-condensation) just on the incidence plane of the light absorption layer 34. FIG. 26b illustrates exemplary optical paths of the control light and the signal light which cause convergence (beam-condensation) at a point offset forward (by, for example, several tens of μm) from the incidence plane of the light absorption layer 34. FIG. 26c illustrates exemplary optical paths of the control light and the signal light which cause convergence (beam-condensation) at a further forward point.

If no control light is emitted, the signal light travels straight. If control light is emitted, the signal light causes deflection. The convergence (beam-condensation) of the signal light having passed the light absorption layer 34 can be detected by the first detector 12 and the second detector 53 shown in FIG. 23 as if the signal light gas been emitted from the convergence (beam-condensing) point 62 of the apparent signal light in the light absorption layer 34 shown in FIGS. 26a, 26b, and 26c. In the case of FIG. 26b, the convergence (beam-condensing) point 63 of the signal light agrees with the convergence (beam-condensing) point 62 of the apparent signal light. However, no agreement of the points 63 and 62 can be obtained in the cases shown in FIGS. 26*a* and 26*c*. The direction of deviation in FIG. 26*a* is opposed to the direction of deviation in FIG. 26*c*.

Although in FIGS. 26*a*, 26*b*, and 26*c* the control light and the signal light travel in the same direction, the directions of travel may be different.

The third collimation lens 9 changes the signal light having passed the light absorption layer to a parallel beam.

The third collimation lens 9 is an aspherical lens having a focal length equal to 8 mm. However, focal length of the third collimation lens 9 is not limited to 8 mm and can be changed to another value, and it is obvious that a more compact optical path switching apparatus can be realized by using a lens having a focal length shorter than 8 mm. Using an aspherical lens can help realize a more compact and lightweight device.

The wavelength selective transmission filter 8 is a dielectric filter that can shield the control light, if the control light has passed through the thermal lens forming optical element 7, and transmit the signal light. If the thermal lens forming optical element 7 can sufficiently absorb the control light, the wavelength selective transmission filter 8 can be omitted.

The signal light having passed through the wavelength selective transmission filter 8 is converged (beam-condensed) by the second collective lens 10 and input to the first detector 12 and the second detector 53. The second collective lens 10 is an aspherical lens having a focal length equal to 8 mm. The focal length of the second collective lens 10 is not limited to 8 mm and can be changed to other value. It is, for example, obvious that a more compact optical path switching apparatus can be realized by using other lens having a focal length shorter than 8 mm. Using an aspherical lens can help realize a more compact and lightweight device. Although the present embodiment is configured with two lenses (i.e., the third collimation lens 9 and the second collective lens 10) for converge (beam-condense) of the signal light, a single lens can be used for convergence (beam-condensation) of the signal light.

Figure 28A:
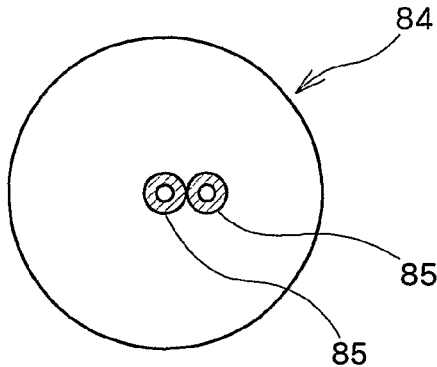
FIG. 28a illustrates a 2-wire optical fiber ferrule.

The 2-wire optical fiber ferrule shown in FIG. 28*a* is provided for the first detector 12 and the second detector 53 shown in FIG. 23. Each of the optical fibers 85 in the 2-wire optical fiber ferrule is a single-mode quartz optical fiber of 9.5 µm. The optical fiber transmits converged (beam-condensed) signal light to each detector. Alternatively, the light detectors can be directly attached to the lens.

The 2-wire optical fiber ferrule shown in FIG. 28*a* includes a signal light receiving optical fiber 85 which can be formed by etching a clad layer of a single-mode quartz optical fiber having a core diameter equal to 9.5 µm with a hydrofluoric acid. To obtain a desired size, the portion to be etched is limited to only a front edge (several mm) of an optical fiber. The size "ω" of an optical fiber subjected to etching is 25 µm in the present embodiment and satisfies the following relationship.

$$\omega = m \times \chi \quad \text{(Formula 6)}$$

where "$\chi$" represents a distance between a convergence point 63 of the signal light converged (beam-condensed) on the light absorption layer and a convergence point 62 of apparent signal light in a direction perpendicular to the optical axis, and "m" represents an imaging magnification of the third collimation lens 9 and the second collective lens 10 shown in FIG. 23. In the present embodiment, "m" is equal to 1. It is preferable to set "m" so as to maximize the incidence efficiency of the light entering the optical fiber.

The value for "$\chi$" can be determined in consideration of the following conditions:

1. positional relationship of the signal light and the control light relative to a convergence (beam-condensation) point of the first collective lens 6 in the light absorption layer of the thermal lens forming optical element;
2. power of the control light;
3. position of the control light (distance between the signal light and the control light at the beam-condensing point of the first collective lens 6 in a direction perpendicular to an optical axis);
4. thickness of the light absorption layer in the thermal lens forming optical element;
5. wavelength of the control light and wavelength of the signal light; and
6. dye concentration in the light absorption layer.

Figure 27:
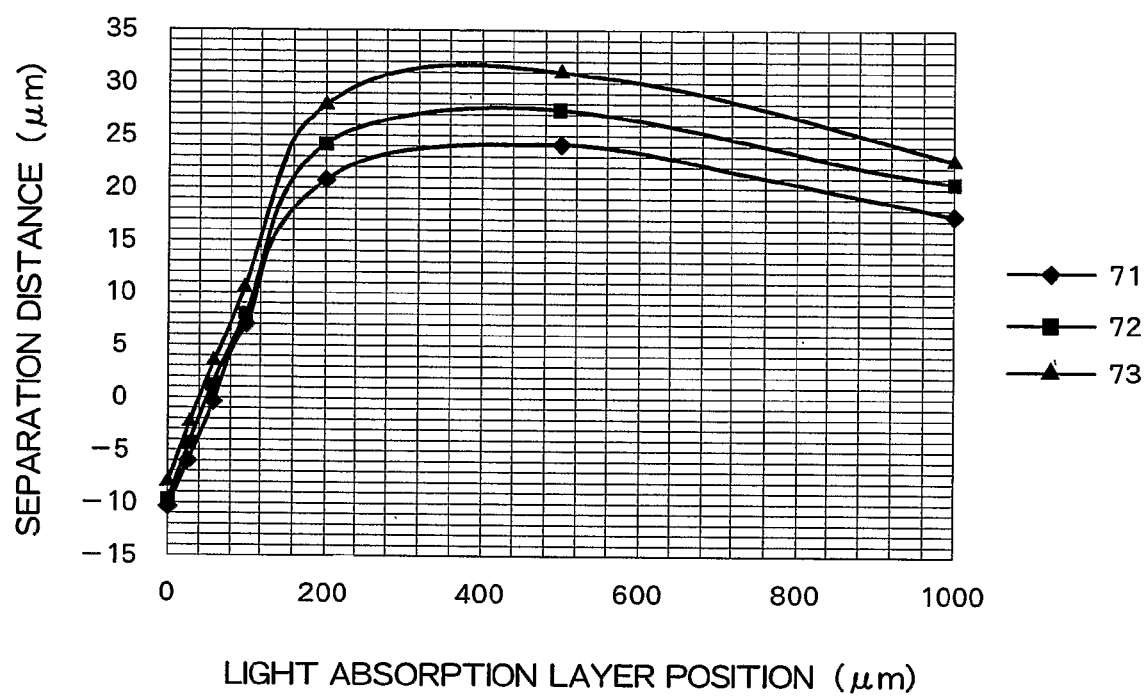
FIG. 27 is a graph illustrating a separation distance between non-deflection light and deflection light.

FIG. 27 illustrates exemplary measurement data with respect to a relationship between "light absorption layer position" and a separation distance between the non-deflection light and the deflection light at the position of the detector. The "light absorption layer position" represents the incidence position of the convergence (beam-condensing) point of the signal light and the control light entering the light absorption layer 34 of the thermal lens forming optical element shown in FIG. 5. According to the measurement data shown in FIG. 27, when the light absorption layer position is 40 to 60 µm, the separation distance is almost 0. This case corresponds to the state shown in FIG. 26*b*. However, when the light absorption layer position deviates from this point, the separation distance becomes larger. When the light absorption layer position exceeds 200 µm, the separation distance did not change largely. In FIG. 27, the origin (i.e., 0-point) indicates an incidence point of signal light. The separation distance becomes a positive value if it corresponds to a direction of deflection. The state of FIG. 26*c* corresponds to a condition where the separation distance is positive. An intermediate state between FIG. 26*a* and FIG. 26*b* corresponds to a condition where the separation distance is negative.

Setting the separation distance equal to the size "ω" of the light-receiving optical fiber is preferable for efficiently detecting the non-deflection light and the deflection light.

In FIG. 27, line 71 (i.e., a solid line connecting rhombic points) represents measured data obtained when the control light power is 15.4 mW, line 72 (i.e., a solid line connecting rectangular points) represents measured data obtained when the control light power is 18 mW, and line 73 (i.e., a solid line connecting triangular points) represents measured data obtained when the control light power is 20.5 mW. The measurement data of FIG. 27 were obtained by shifting a slit-opening equipped detector at the position corresponding to the first detector 12 shown in FIG. 23. According to the example used for obtaining the data shown in FIG. 27, the light absorption layer has a thickness equal to 1000 µm, and the control light position (i.e., distance between the signal light and the control light at the beam-condensing point of the first collective lens 6 in a direction perpendicular to the optical axis) is 25 µm. The dye concentration is 0.1% and the transmissivity of the light absorption layer is 95% at a wavelength equal to 1550 nm and 0.1% at a wavelength equal to 980 nm.

The present embodiment uses a thermal lens forming optical element including a light absorption layer having a thickness substantially equal to 1000 µm. The control light power is approximately 16 mW. The light absorption layer position is 500 µm. And, the control light position (i.e., distance between the signal light and the control light at the beam-condensing point of the first collective lens 6 in a direction perpendicular to the optical axis) is 25 μm. To improve the incidence efficiency of light entering the light-receiving optical fiber, position adjustment of the first detector detecting the non-deflection light was first performed. Then, adjustment of a control light power was performed so as to improve the incidence efficiency of light entering the second detector.

If the light absorption layer position is set to a value less than 500 μm, incidence angles of the non-deflection light and the deflection light entering the optical fibers become different from each other and the incidence efficiency of the light entering respective optical fibers cannot be increased.

Figure 29:
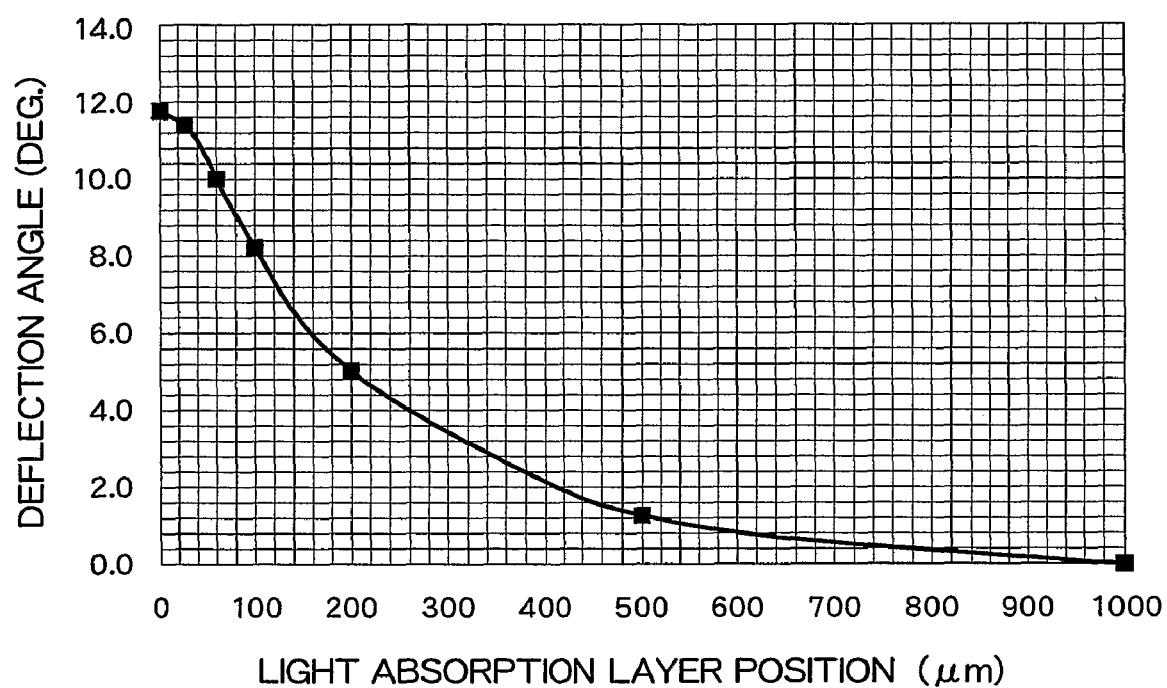
FIG. 29 is a graph illustrating a relationship between light absorption layer position and deflection angle.

FIG. 29 illustrates exemplary data with respect to a relationship between the light absorption layer position (i.e., incidence position of the convergence (beam-condensing) point of the signal light and the control light entering the light absorption layer 34 of the thermal lens forming optical element 7) and the deflection angle. The third collimation lens 9 and the second collective lens 10 used in the present embodiment have the same focal length equal to 8 mm. Thus, the deflection angle is equal to an angle formed between an optical axis of the deflection light entering an optical fiber and an optical axis of the non-deflection light entering an optical fiber. Therefore, if the light absorption layer position is less than 500 μm, the incidence efficiency of the light entering each optical fiber cannot be increased, the reason for which is described below.

In general, the single-mode quartz optical fiber of 9.5 μm has a numerical aperture (hereinafter, referred to as NA) of 0.1. The maximum incidence angle θc at which the light can propagate in an optical fiber having an NA value equal to 0.1 is approximately 5.7 degrees.

$$\theta c = \mathrm{Sin}^{-1}(0.1) \approx 5.7 \text{ degrees} \tag{Formula 7}$$

Furthermore, the signal light is also input using a single-mode quartz optical fiber having a core diameter equal to 9.5 μm. Therefore, the numerical aperture (NA) of the optical fiber is equal to 0.1. The convergence (beam-condensing) angle of the signal light is approximately 5.7 degrees. Therefore, if the non-deflection light is adjusted to attain a maximum incidence light quantity, part of the deflection light exceeds a maximum incidence angle θc of an optical fiber and the light quantity of the deflection light decreases. If the deflection light is adjusted to attain a maximum incidence light quantity, part of the non-deflection light exceeds the maximum incidence angle θc of an optical fiber and the light quantity of the non-deflection light decreases.

According to the example used for obtaining the data shown in FIG. 29, the control light power is approximately 12.9 mW and the control light position (i.e., distance between the signal light and the control light at the beam-condensing point of the first collective lens 6 in a direction perpendicular to the optical axis) is 35 μm. The light absorption layer has a thickness equal to 1000 μm, and the dye concentration is 0.1%. The transmissivity of the light absorption layer is 95% at a wavelength equal to 1550 nm and 0.1% at a wavelength equal to 980 nm.

FIG. 30 illustrates exemplary measurement data. In FIG. 30, all measurement data corresponding to 0.1 μW or less are indicated as a representative value because a measurement device was not reliable in measurement values at 0.1 μW or less. Similarly, extinction ratio calculation data corresponding to 0.1 μW or less are indicated as a representative value. The extinction ratio obtained for each of the non-deflection light and the deflection light was approximately 40 dB.

Comparative Example 3

The Comparative Example 3 is similar to the eighth embodiment except that the collective lens 6 is not used and the signal light and the control light are respectively collimated and input into the thermal lens forming optical element 7 without being converged and the third collimation lens 9 is not used. According to the experimental data of Comparative Example 3, no deflection of the signal light was observed when the control light is emitted at a power level equal to 18 mW. Hence, the control light source was changed to Ti: sapphire laser to emit control light (980 nm) having a higher power. As the solvent of the dye solution in the thermal lens forming optical element began boiling before deflection of the signal light was detected, it was confirmed that causing deflection of the signal light would be difficult. The power of the control light was then reduced to a lower level, just below the level at which boiling would start. Then, the layout and an inter-beam distance between the signal light and the control light were finely adjusted on a path leading to the thermal lens forming optical element. However, no optical path deflection of the signal light was observed. Furthermore, the layout and an inter-beam distance between the signal light and the control light in the light absorption layer of the thermal lens forming optical element was finely adjusted. However, no optical path deflection of the signal light was observed. Namely, if the control light is emitted as a collimated parallel beam so as to prevent the converged control light from diffusing and causing light absorption in the light absorption layer of the thermal lens forming optical element, a thermal lens having a sufficient size for deflecting an optical path of the signal light cannot be formed.

Ninth Embodiment

Figure 24:
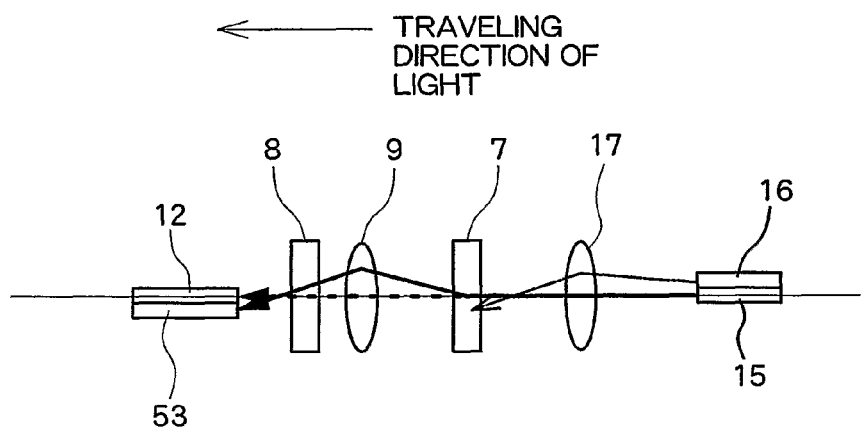
FIG. 24 illustrates an optical path switching apparatus according to a ninth embodiment of the present invention.

FIG. 24 illustrates an optical path switching apparatus according to a ninth embodiment of the present invention. In the ninth embodiment of the present invention, optical members similar to those described in the eighth embodiment are denoted by the same reference numerals.

The optical path switching apparatus shown in FIG. 24 includes a second signal light incidence terminal 15, a second control light incidence terminal 16, a first image-forming lens 17 having a focal length equal to 8 mm, and a second image-forming lens 9. Elsewhere, the arrangement of the optical path switching apparatus shown in FIG. 24 is similar to that illustrated in FIG. 23. The signal light used in the ninth embodiment has a wavelength equal to 1550 nm, and the control light has a wavelength equal to 980 nm. However, as in the eighth embodiment, it is obvious that other wavelengths can be selected for the signal light and the control light. Furthermore, also similar to the eighth embodiment, the deflection amount (deflection angle) varies with changes in the power of the control light.

Figure 28B:
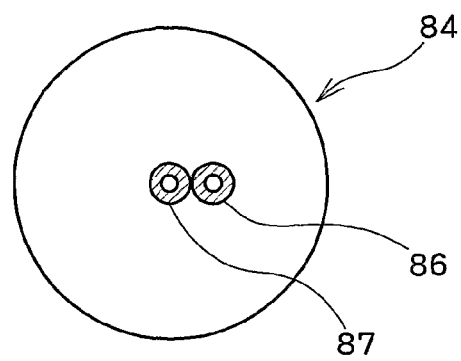
FIG. 28b illustrates another 2-wire optical fiber ferrule.

FIG. 28b illustrates a 2-wire optical fiber ferrule provided for the second signal light incidence terminal 15 and the second control light incidence terminal 16.

The 2-wire optical fiber ferrule shown in FIG. 28a includes a signal light emission fiber 87 and control light emission fibers 86 which are formed by etching a clad layer of a single-mode quartz optical fiber having a core diameter equal to 9.5 μm with a hydrofluoric acid. To obtain a desired size, the portion to be etched is limited to only a front edge (several mm) of an optical fiber. The size "ω" of an optical fiber subjected to etching satisfies the following relationship.

$$\omega = \chi/n \quad \text{(Formula 8)}$$

where "χ" represents a distance between convergence (beam-condensing) points of the signal light and the control light converged (beam-condensed) in the light absorption layer in a direction perpendicular to the optical axis, and "n" represents an imaging magnification of the fourth collective lens 17. In the present embodiment, "n" is equal to 1. If "n" is small, the size of an etched optical fiber becomes larger. If "n" is large, the size of an etched optical fiber becomes smaller.

In the present embodiment, "n" is equal to 1 and "ω" is equal to 25 μm. As apparent from the first embodiment, if "ω" is large, the deflection angle becomes smaller. Therefore, an appropriate value of "ω" is within the range of 25 to 50 microns. If "ω" is equal to or less than 25 μm, a laser beam has insufficient transmissivity. In particular, a laser beam of 980 nm has bad transmissivity in a level of 20% to 80% when the laser beam passes through a fiber of 1 m long.

According to the example shown in FIG. 28a, an optical fiber for the control light and an optical fiber for the signal light were fixed in holes of the ferrules using appropriate adhesive. The size of each hole was 2ω+several μm. The front edge of the optical fiber was polished before use.

The optical fiber used in the present embodiment is a single-mode optical fiber having a core diameter equal to 9.5 μm. If the wavelength of a laser beam is changed, an optical fiber having a suitable core diameter is required. For example, the core diameter can be selected to 4.5 μm for the control light of 660 nm.

The light deflection amount (deflection angle) obtained in the present embodiment was comparable to that described in the eighth embodiment.

Tenth Embodiment

Figure 25:
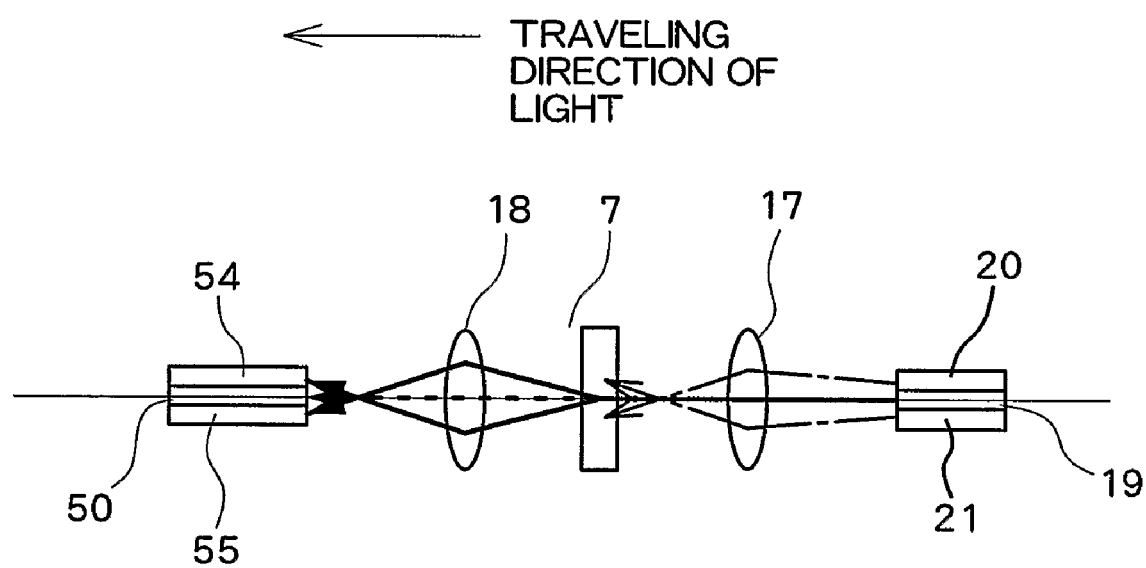
FIG. 25 illustrates an optical path switching apparatus according to a tenth embodiment of the present invention.

FIG. 25 illustrates an optical path switching apparatus according to a tenth embodiment of the present invention. In the tenth embodiment of the present invention, optical members similar to those described in the eighth and ninth embodiments are denoted by the same reference numerals. The tenth embodiment differs from the ninth embodiment in that an additional control light is added to provide a total of three switchable optical paths. The optical path switching apparatus shown in FIG. 25 includes a tenth signal light incidence terminal 19, a third control light incidence terminal 20, a fourth control light incidence terminal 21, a third detector 50, a fourth detector 54, and a fifth detector 55. The rest of the arrangement of the optical path switching apparatus shown in FIG. 25 is similar to those disclosed in FIGS. 23 and 24. The signal light used in the tenth embodiment has a wavelength equal to 1550 nm, and the control light has a wavelength equal to 980 nm, although, as in the eighth and ninth embodiments, other wavelengths can be selected for the signal light and the control light. Furthermore, and also similar to the eighth and ninth embodiments, the deflection amount (deflection angle) varies in connection with changes in the power of the control light.

Figure 28C:
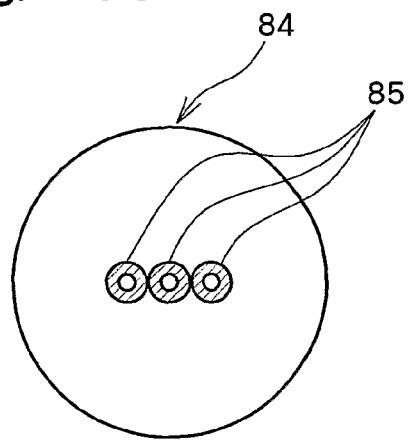
FIG. 28c illustrates a 3-wire optical fiber ferrule.
Figure 28D:
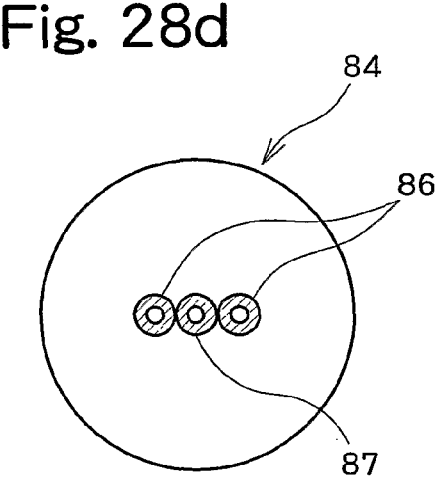
FIG. 28d illustrates another 3-wire optical fiber ferrule.

FIG. 28d illustrates a 3-wire optical fiber ferrule provided for the signal light incidence terminal 19 of the tenth embodiment, the third control light incidence terminal 20, and the fourth control light incidence terminal 21.

The 3-wire optical fiber ferrule shown in FIG. 28d includes a signal light emission fiber 87 and control light emission fibers 86 which are formed by etching a clad layer of a single-mode quartz optical fiber having a core diameter equal to 9.5 μm with a hydrofluoric acid. To obtain a desired size, the portion to be etched is limited to only a front edge (several mm) of an optical fiber. The size "ω" of an optical fiber subjected to etching satisfies the following relationship.

$$\omega = \chi/n \quad \text{(Formula 9)}$$

where "χ" represents a distance between convergence (beam-condensing) points of the signal light and the control light converged (beam-condensed) in the light absorption layer in a direction perpendicular to the optical axis, and "n" represents an imaging magnification of the first collective lens 17. In the present embodiment, "n" is equal to 1. If "n" is small, the size of an etched optical fiber becomes larger. If "n" is large, the size of an etched optical fiber becomes smaller.

FIG. 28c illustrates a 3-wire optical fiber ferrule provided for the third detector 50, the fourth detector 54, and the fifth detector 55. The optical fiber 85 attached to the 3-wire optical fiber ferrule is a single-mode quartz optical fiber having a core diameter equal to 9.5 μm. The optical fiber transmits converged (beam-condensed) signal light to each detector. Alternatively, the light detectors can be directly attached to the lens.

The 3-wire optical fiber ferrule shown in FIG. 28c includes a signal light receiving optical fiber which can be formed by etching a clad layer of a single-mode quartz optical fiber having a core diameter equal to 9.5 μm with a hydrofluoric acid. To obtain a desired size, the portion to be etched is limited to only a front edge (several mm) of an optical fiber. The size "ω" of an optical fiber subjected to etching is 25 μm in the present embodiment and satisfies the following relationship.

$$\omega = m^* \chi \quad \text{(Formula 10)}$$

where "χ" represents a distance between a convergence point 63 of the signal light converged (beam-condensed) on the light absorption layer and a convergence point 62 of apparent signal light in a direction perpendicular to the optical axis (refer to FIGS. 26a, 26b, and 26c), and "m" represents an imaging magnification of a second image-forming lens 18. In the present embodiment, "m" is equal to 1. It is preferable to set "m" so as to maximize the incidence efficiency of the light entering into the optical fiber.

The 3-wire optical fiber shown in FIG. 28d is an example capable of realizing a one-dimensional optical path switching. However, a two-dimensional optical path switching can be realized by arranging the third control light incidence terminal 20 and the fourth control light incidence terminal 21 to form an angle equal to 90 or 120 degrees.

Figure 28E:
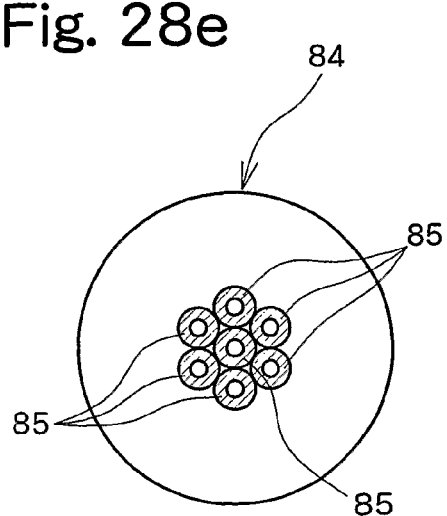
FIG. 28e illustrates a 7-wire optical fiber ferrule.
Figure 28F:
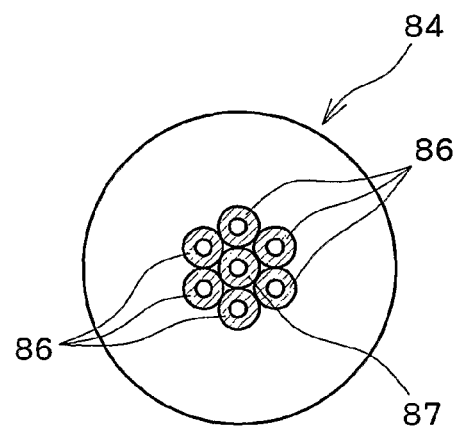
FIG. 28f illustrates another 3-wire optical fiber ferrule.

FIG. 28f illustrates an example of a 7-wire optical fiber ferrule including a central signal light emission fiber 87 and a total of six control light emission fibers 86 surrounding the central fiber 87. According to this example, the optical path of the signal light and the control light entering optical fibers can be switched in seven directions (including no emission of the control light). The 7-wire optical fiber ferrule shown in FIG. 28f can be set to the signal light incidence terminal and the control light incidence terminal shown in FIG. 24 or 25. In this case, optical path switching detection can be realized by using a 7-wire optical fiber ferrule including a total of seven signal light receiving optical fibers, for example, shown in FIG. 28e. According to the example shown in FIG. 28e, seven same-size optical fibers are tightly assembled in such a manner that six signal light receiving optical fibers 85 are uniformly disposed around a central signal light receiving optical fiber 85. A manufacturing method for a 7-wire optical fiber ferrule is similar to the manufacturing method for a 2-wire or 3-wire optical fiber ferrule.

The optical path switching data obtained in the present embodiment are similar to those obtained in the eighth embodiment and ninth embodiment.

As described above, the present invention can locally increase the light power density by inputting beam-condensed control light into a light absorption layer. Furthermore, the present invention can locally increase the temperature in the light absorption layer with a low-power and can change a refractive index at the temperature-increased portion and its vicinity. Furthermore, the present invention can input beam-condensed signal light to the control light irradiation position of the light absorption layer or its vicinity. Thus, the present invention can efficiently utilize the change of refractive index by the control light, and can realize deflection of the signal light. The present invention can realize an optical path switching by utilizing the deflection of the signal light.

Furthermore, the present invention can input beam-condensed control light to the incidence plane of the light absorption layer or its vicinity. The control light can diffuse from the convergence point (beam-condensing point) in the light absorption layer. The refractive index can change largely. The signal light can deflect largely. Because the signal light subjected to optical path switching is output from the thermal lens forming optical element, the signal light subjected to optical path switching has a uniform beam cross section throughout the beam condensation path. Thus, the signal light subjected to optical path switching can be later beam-condensed and effectively used.

Furthermore, the present invention can beam-condense the control light and the signal light at convergence (beam-condensing) points which are close to each other, thus enabling high-speed optical deflection. Furthermore, because the deflected signal light output from the thermal lens forming optical element has a uniform beam cross section throughout the beam condensatio, the deflected signal light can be later beam-condensed and effectively used. Namely, the present invention can provide an efficient optical coupling to optical fibers which enables deflection of light while holding an energy distribution at a signal light cross section in a state capable of easily realizing convergence of light according to diffraction optics (e.g., Gaussian distribution).

Furthermore, the present invention can input a plurality of control light beams to the same light absorption layer to switch one input to an output selected from a plurality of different optical paths.

Furthermore, the present invention can input and detect a plurality of beams of the control light and the signal light as well as a plurality of optical path switching signal light beams with optical fibers closely disposed. Thus, the present invention can provide a more compact and lower cost apparatus.

Furthermore, the present invention can beam-condense the control light and the signal light at convergence (beam-condensing) points which are close to each other. Thus, the present invention can realize a high-speed optical deflection.

Furthermore, the present invention can use a low-power semiconductor laser and can provide a more compact and lower cost optical deflection apparatus.

The deflection method and the deflection element of the present invention can be applied to an image display apparatus, a spatial information transmission apparatus, and an optical switching apparatus.

The invention claimed is:

1. An optical deflection method comprising:

emitting control light and signal light into a light absorption layer in a thermal lens forming optical element so that the control light and the signal light converge at different convergence points in the light absorption layer, wherein a wavelength of the control light is different from a wavelength of the signal light, the wavelength of the control light is selected from a wavelength band that the light absorption layer can absorb, and the wavelength of the signal light is selected from a wavelength band that the light absorption layer cannot absorb; and causing convergence and divergence of the control light and the signal light on an incidence plane of the light absorption layer or its vicinity in a light traveling direction, so that a thermal lens can be reversibly formed in the light absorption layer due to a temperature increase occurring in a region where the control light is absorbed and its peripheral region, and the refractive index of the thermal lens changes to change a traveling direction of the signal light, wherein two or more control light beams are emitted into the light absorption layer so that the traveling direction of the signal light can be changed based on a combination of two or more control beams.

2. An optical deflection apparatus comprising:

a signal light source configured to emit signal light having one or more wavelengths;

a control light source configured to emit control light having a wavelength different from the wavelength of the signal light;

a thermal lens forming optical element including a light absorption layer configured to transmit the signal light and selectively absorb the control light; and a beam-condensing unit configured to cause beam-condensation of the control light and the signal light at different convergence points in the light absorption layer, wherein the thermal lens forming optical element causes convergence and divergence of the control light and the signal light on an incidence plane of the light absorption layer or its vicinity in a light traveling direction, wherein a thermal lens is reversibly formed in the light absorption layer due to a temperature increase occurring in a region where the control light is absorbed and its peripheral region, and the refractive index of the thermal lens changes to change a traveling direction of the signal light, and the control light source emits two or more control light beams, and the beam-condensing unit causes beam-condensation or convergence of the two or more control light beams in the light absorption layer so as to have different convergence points.

3. An optical path switching method comprising:

selecting emission of control light according to desired information;

emitting the control light and signal light into a light absorption layer in a thermal lens forming optical element so that the control light and the signal light converge at different convergence points in the light absorption layer in a direction perpendicular to an optical axis, wherein a wavelength of the control light differs from a wavelength of the signal light, the wavelength of the control light is selected from a wavelength band that the light absorption layer can absorb, and the wavelength of the signal light is selected from a wavelength band that the light absorption layer cannot absorb;

causing convergence and divergence of the control light and the signal light on an incidence plane of the light absorption layer or its vicinity in a light traveling direction, so that a thermal lens can be reversibly formed in the light absorption layer due to a temperature increase occurring in a region where the control light is absorbed and its peripheral region, and the thermal lens changes a refractive index to change a traveling direction of the signal light; and separately outputting first signal light having a traveling direction not changed by the emission of the control light and second signal light having a traveling direction changed by the emission of the control light depending on respective traveling directions, wherein beam-condensation or convergence of the control light and the signal light is caused on the incidence plane of the light absorption layer or in the light absorption layer in the light traveling direction.

4. An optical path switching method comprising:

selecting emission of control light according to desired information;

emitting the control light and signal light into a light absorption layer in a thermal lens forming optical element so that the control light and the signal light converge at different convergence points in the light absorption layer in a direction perpendicular to an optical axis, wherein a wavelength of the control light differs from a wavelength of the signal light, the wavelength of the control light is selected from a wavelength band that the light absorption layer can absorb, and the wavelength of the signal light is selected from a wavelength band that the light absorption layer cannot absorb;

causing convergence and divergence of the control light and the signal light on an incidence plane of the light absorption layer or its vicinity in a light traveling direction, so that a thermal lens can be reversibly formed in the light absorption layer due to a temperature increase occurring in a region where the control light is absorbed and its peripheral region, and the thermal lens changes a refractive index to change a traveling direction of the signal light; and separately outputting first signal light having a traveling direction not changed by the emission of the control light and second signal light having a traveling direction changed by the emission of the control light depending on respective traveling directions, wherein the first signal light having a traveling direction not changed by the emission of the control light and the second signal light having a traveling direction changed by the emission of the control light are beam-condensed by a lens and directed into a detection unit, the detection unit is an optical fiber that can receive the first signal light and the second signal light from the lens, and the first signal light and the second signal light having entered the optical fiber from the lens have optical axes forming an angle two times or more greater than the maximum incidence angle that the optical fiber can propagate.

5. An optical path switching method comprising:

selecting emission of control light according to desired information;

emitting the control light and signal light into a light absorption layer in a thermal lens forming optical element so that the control light and the signal light converge at different convergence points in the light absorption layer in a direction perpendicular to an optical axis, wherein a wavelength of the control light differs from a wavelength of the signal light, the wavelength of the control light is selected from a wavelength band that the light absorption layer can absorb, and the wavelength of the signal light is selected from a wavelength band that the light absorption layer cannot absorb;

causing convergence and divergence of the control light and the signal light on an incidence plane of the light absorption layer or its vicinity in a light traveling direction, so that a thermal lens can be reversibly formed in the light absorption layer due to a temperature increase occurring in a region where the control light is absorbed and its peripheral region, and the thermal lens changes a refractive index to change a traveling direction of the signal light; and separately outputting first signal light having a traveling direction not changed by the emission of the control light and second signal light having a traveling direction changed by the emission of the control light depending on respective traveling directions, wherein a plurality of control light beams are emitted to the light absorption layer according to an optical path switching number, and a plurality of signal light beams are output according to the optical path switching number by changing the traveling direction of the signal light based on a combination of plurality of control light beams.

6. An optical path switching apparatus, comprising:

a signal light source configured to emit signal light having one or more wavelengths;

a control light source configured to emit control light having a wavelength different from the wavelength of the signal light;

a thermal lens forming optical element including a light absorption layer configured to transmit the signal light and selectively absorb the control light; and a beam-condensing unit configured to cause beam-condensation of the control light and the signal light at different convergence points in the light absorption layer in a direction perpendicular to an optical axis, wherein the thermal lens forming optical element causes convergence and divergence of the control light and the signal light on an incidence plane of the light absorption layer or its vicinity in a light traveling direction, wherein a thermal lens is reversibly formed in the light absorption layer due to a temperature increase occurring in a region where the control light is absorbed and its peripheral region, and the thermal lens changes a refractive index to change a traveling direction of the signal light, the optical path switching apparatus further comprises:

an output unit configured to separately output a first signal light having a traveling direction not changed by the emission of the control light and a second signal light having a traveling direction changed by the emission of the control light depending on respective traveling directions, and the control light source emits two or more control light beams according to an optical path switching number, and the beam-condensing unit changes convergence points of the a plurality of control light beams relative to the optical axis in a vertical direction to cause different convergence or cause beam-condensation in the light absorption layer.

7. An optical path switching method, comprising:

selecting emission of control light according to desired information;

emitting the control light and signal light into a light absorption layer in a thermal lens forming optical element so that the control light and the signal light converge at different convergence points in the light absorption layer in a direction perpendicular to an optical axis, wherein a wavelength of the control light is different from a wavelength of the signal light, the wavelength of the control light is selected from a wavelength band that the light absorption layer can absorb, and the wavelength of the signal light is selected from a wavelength band that the light absorption layer cannot absorb;

causing convergence and divergence of the control light and the signal light on an incidence plane of the light absorption layer or its vicinity in a light traveling direction, so that a thermal lens can be reversibly formed in the light absorption layer due to a temperature increase occurring in a region where the control light is absorbed and its peripheral region, and the thermal lens changes a refractive index to change a traveling direction of the signal light; and detecting first signal light having a traveling direction not changed by the emission of the control light and second signal light having a traveling direction changed by the emission of the control light which are beam-condensed or converged by a same optical system, wherein a plurality of control light beams are emitted to the light absorption layer according to an optical path switching number, and the traveling direction of the signal light is changed based on a combination of the a plurality of control light beams, wherein a plurality of signal light beams according to the optical path switching number and signal light not subjected to change of signal direction are converged or beam-condensed to the optical detection unit.

8. An optical path switching method comprising:

selecting emission of control light according to desired information;

emitting the control light and signal light into a light absorption layer in a thermal lens forming optical element so that the control light and the signal light converge at different convergence points in the light absorption layer in a direction perpendicular to an optical axis, wherein a wavelength of the control light is different from a wavelength of the signal light, the wavelength of the control light is selected from a wavelength band that the light absorption layer can absorb, and the wavelength of the signal light is selected from a wavelength band that the light absorption layer cannot absorb; and causing convergence and divergence of the control light and the signal light on an incidence plane of the light absorption layer or its vicinity in a light traveling direction, so that a thermal lens can be reversibly formed in the light absorption layer due to a temperature increase occurring in a region where the control light is absorbed and its peripheral region, and the thermal lens changes a refractive index to change a traveling direction of the signal light, and detecting first signal light having a traveling direction not changed by the emission of the control light and second signal light having a traveling direction changed by the emission of the control light which are beam-condensed or converged by a same optical system, wherein the first signal light having a traveling direction not changed by the emission of the control light and the second signal light having a traveling direction changed by the emission of the control light have convergence points in the light absorption layer which are mutually separated as virtual convergence points, and a distance between virtual convergence points of the signal light received by an optical fiber without change of signal direction and one or more signal lights subjected to switching of optical path in the light absorption layer is equal to a value obtained by dividing a distance between the light-receiving optical fibers by a lens magnification.

9. An optical path switching apparatus comprising:

a signal light source configured to emit signal light having one or more wavelengths;

a control light source configured to emit control light having a wavelength different from the wavelength of the signal light;

a thermal lens forming optical element including a light absorption layer configured to transmit the signal light and selectively absorb the control light; and a beam-condensing unit configured to cause beam-condensation of the control light and the signal light at different convergence points in the light absorption layer in a direction perpendicular to an optical axis, wherein the thermal lens forming optical element causes convergence and divergence of the control light and the signal light on an incidence plane of the light absorption layer or its vicinity in a light traveling direction, wherein a thermal lens is reversibly formed in the light absorption layer due to a temperature increase occurring in a region where the control light is absorbed and its peripheral region, and the thermal lens changes a refractive index to change a traveling direction of the signal light, the optical path switching apparatus further comprises:

an optical detection unit configured to receiving first signal light having a traveling direction not changed by the emission of the control light and second signal light having a traveling direction changed by the emission of the control light which are beam-condensed or converged by a same optical system, the optical detection unit is an optical fiber, the thermal lens formed in the light absorption layer of the thermal lens forming optical element causes the first signal light having a traveling direction not changed by the emission of the control light and the second signal light having a traveling direction changed by the emission of the control light to have convergence points in the light absorption layer which are mutually separated as virtual convergence points, and a distance between virtual convergence points of the signal light entering the optical fiber without change of signal direction and one or more signal lights subjected to switching of optical path in the light absorption layer is equal to a value obtained by dividing a distance between the light-receiving optical fibers by a lens magnification.

10. An optical path switching apparatus comprising:

a signal light source configured to emit signal light having one or more wavelengths;

a control light source configured to emit control light having a wavelength different from the wavelength of the signal light;

a thermal lens forming optical element including a light absorption layer configured to transmit the signal light and selectively absorb the control light; and a beam-condensing unit configured to cause beam-condensation of the control light and the signal light at different convergence points in the light absorption layer in a direction perpendicular to an optical axis, wherein the thermal lens forming optical element causes convergence and divergence of the control light and the signal light on an incidence plane of the light absorption layer or its vicinity in a light traveling direction, wherein a thermal lens is reversibly formed in the light absorption layer due to a temperature increase occurring in a region where the control light is absorbed and its peripheral region, and the thermal lens changes a refractive index to change a traveling direction of the signal light, the optical path switching apparatus further comprises:

an optical detection unit configured to receiving first signal light having a traveling direction not changed by the emission of the control light and second signal light having a traveling direction changed by the emission of the control light which are beam-condensed or converged by a same optical system, and the control light source emits two or more control light beams according to an optical path switching number, and the beam-condensing unit changes convergence points of the a plurality of control light beams relative to the optical axis in a vertical direction to cause different convergence or cause beam-condensation in the light absorption layer.

* * * * *